(12) United States Patent
Britti et al.

(10) Patent No.: US 9,043,930 B2
(45) Date of Patent: *May 26, 2015

(54) APPLICANT SCREENING

(71) Applicant: TransUnion Rental Screening Solutions, Inc., Greenwood Village, CO (US)

(72) Inventors: Michael A. Britti, Lone Tree, CO (US); Robert D. Thornley, Denver, CO (US); Joel R. Springer, Englewood, CO (US); Michael J. Mauseth, Bethesda, MD (US); Michael J. Collins, Denver, CO (US)

(73) Assignee: TransUnion Rental Screening Solutions, Inc., Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/857,323

(22) Filed: Apr. 5, 2013

(65) Prior Publication Data

US 2013/0219514 A1 Aug. 22, 2013

Related U.S. Application Data

(63) Continuation of application No. 11/490,616, filed on Jul. 21, 2006, now Pat. No. 8,418,254, which is a continuation-in-part of application No. 11/189,024, filed on Jul. 25, 2005, now Pat. No. 8,234,498.

(51) Int. Cl.
*G06F 21/62* (2013.01)
*G06Q 10/06* (2012.01)
*G06Q 10/10* (2012.01)

(Continued)

(52) U.S. Cl.
CPC .............. *G06F 21/62* (2013.01); *G06Q 10/06* (2013.01); *G06Q 10/10* (2013.01); *G06Q 20/3674* (2013.01); *G06Q 40/02* (2013.01); *G06Q 50/16* (2013.01); *G06Q 50/20* (2013.01)

(58) Field of Classification Search
CPC ...................................................... G06F 21/62
USPC ............................................................. 726/5
See application file for complete search history.

(56) References Cited

U.S. PATENT DOCUMENTS

| | | | |
|---|---|---|---|
| 4,774,664 A | 9/1988 | Campbell et al. | |
| 4,876,648 A | 10/1989 | Lloyd | |

(Continued)

OTHER PUBLICATIONS

Non-final Office Action, U.S. Appl. No. 11/189,024, dated Jul. 20, 2010, 12 pages.

(Continued)

*Primary Examiner* — Pramila Parthasarathy
(74) *Attorney, Agent, or Firm* — HolzerIPLaw, PC

(57) ABSTRACT

Systems and methods for screening applicants are disclosed herein. A method of screening applicants is performed by a screening server. The server begins by receiving a selection of screening services and an applicant profile that identifies an applicant. The screening continues by generating screening results specified by the selection of screening services based on the applicant profile. A property manager is then notified that the screening results are available for the applicant based upon the applicant profile. The screening results are then provided to the property manager based upon the applicant profile. Based on these screening results, the screener or property manager can make a decision about the applicant and communicate a decision action to the applicant.

20 Claims, 36 Drawing Sheets

(51) Int. Cl.
*G06Q 20/36* (2012.01)
*G06Q 40/02* (2012.01)
*G06Q 50/16* (2012.01)
*G06Q 50/20* (2012.01)

(56) References Cited

U.S. PATENT DOCUMENTS

| | | | |
|---|---|---|---|
| 4,948,174 | A | 8/1990 | Thomson et al. |
| 4,953,085 | A | 8/1990 | Atkins |
| 5,214,579 | A | 5/1993 | Wolfberg et al. |
| 5,274,547 | A | 12/1993 | Zoffel et al. |
| 5,615,408 | A | 3/1997 | Johnson et al. |
| 5,754,850 | A | 5/1998 | Janssen |
| 5,844,817 | A | 12/1998 | Lobley et al. |
| 5,995,947 | A | 11/1999 | Fraser et al. |
| 6,029,149 | A | 2/2000 | Dykstra et al. |
| 6,044,352 | A | 3/2000 | Deavers |
| 6,049,784 | A | 4/2000 | Weatherly et al. |
| 6,088,686 | A | 7/2000 | Walker et al. |
| 6,119,103 | A | 9/2000 | Basch et al. |
| 6,128,602 | A | 10/2000 | Northington et al. |
| 6,154,729 | A | 11/2000 | Cannon et al. |
| 6,185,545 | B1 | 2/2001 | Resnick et al. |
| 6,236,973 | B1 | 5/2001 | Dillard |
| 6,311,169 | B2 | 10/2001 | Duhon |
| 6,850,901 | B1 | 2/2005 | Hunter et al. |
| 6,871,140 | B1 | 3/2005 | Florance et al. |
| 6,898,574 | B1 | 5/2005 | Regan |
| 6,945,457 | B1 | 9/2005 | Barcelou |
| 7,212,979 | B1 | 5/2007 | Matz et al. |
| 7,376,619 | B1 | 5/2008 | Jones et al. |
| 7,398,218 | B1 | 7/2008 | Bernaski et al. |
| 8,229,850 | B2 * | 7/2012 | Dilip et al. .............. 705/40 |
| 2001/0034700 | A1 | 10/2001 | Foss et al. |
| 2001/0037280 | A1 | 11/2001 | Ingraham et al. |
| 2002/0013906 | A1 | 1/2002 | Wallach et al. |
| 2002/0026411 | A1 | 2/2002 | Nathans et al. |
| 2002/0072927 | A1 | 6/2002 | Phelan et al. |
| 2002/0082962 | A1 | 6/2002 | Farris et al. |
| 2002/0147680 | A1 | 10/2002 | Cho et al. |
| 2002/0161606 | A1 | 10/2002 | Bennett et al. |
| 2002/0169641 | A1 | 11/2002 | Wallace, Jr. |
| 2002/0198819 | A1 | 12/2002 | Munoz et al. |
| 2003/0033261 | A1 | 2/2003 | Knegendorf |
| 2003/0093289 | A1 | 5/2003 | Thornley et al. |
| 2003/0187756 | A1 | 10/2003 | Klivington et al. |
| 2003/0204425 | A1 | 10/2003 | Kennedy et al. |
| 2003/0208362 | A1 | 11/2003 | Enthoven et al. |
| 2004/0030640 | A1 | 2/2004 | Mahnken et al. |
| 2004/0230636 | A1 | 11/2004 | Masuoka et al. |
| 2004/0243518 | A1 | 12/2004 | Clifton et al. |
| 2005/0071202 | A1 | 3/2005 | Kendrick |
| 2005/0144028 | A1 | 6/2005 | Donahue et al. |
| 2005/0177488 | A1 | 8/2005 | Rexrode |

OTHER PUBLICATIONS

Non-final Office Action, U.S. Appl. No. 11/189,024, dated Apr. 28, 2009, 27 pages.
Non-final Office Action, U.S. Appl. No. 11/189,024, dated Dec. 1, 2009, 11 pages.
Response and Amendment to Apr. 28, 2009 non-final office action, U.S. Appl. No. 11/189,024, dated Jul. 27, 2009, 12 pages.
Response and Amendment to Dec. 1, 2009 non-final office action, U.S. Appl. No. 11/189,024, dated May 27, 2010, 14 pages.
What is the U.D. Registry, U.D Registry, Inc. Website Archive 1998, printed Jul. 13, 2007, http://web.archive.org/web/19980524113221/http://www.udregistry.com/who.htm; 12 page.
Patent Cooperation Treaty (PCT) Written Opinion, (Form/PCT/ISA/210), US Patent and Trademark Office as International Search Authority, PCT Application No. PCT/US06/29022, Applicant: RentPort, Inc., 5 pages, Mar. 23, 2007.
"Are You Blacklisted," ohmyapt.apartmentratings.com., Oct. 17, 2005, 15 pages.
"Bill Would Restrict Firms that Investigate Tenants," Newsday, Feb. 22, 1986, 4 pages.
"Company aims to ease rental problems for all," The Press Democrat, Aug. 19, 2000, 1 page.
"Renters Beware," Wall Street Journal, Aug. 2, 2000, 3 pages.
"RentPort announced credit service," Real Estate Weekly, Sep. 13, 2000, 1 page.
Applicant Screening, Saferent Applicant Screening Website Archive 2001, Jul. 13, 2007, http://web.archive.org/web/2001020807622/www.saferent.com/services/content; 6 pages.
Final Office Action, U.S. Appl. No. 10/209,094, dated Apr. 27, 2010, 20 pages.
Interview Summary, U.S. Appl. No. 10/209,094, dated Sep. 20, 2010, 3 pages.
Mark Edward Facsimile Transmission from Rent Roll Inc., 2395 Midway Road, Carrollton, TX 75006, "Pages of Information to Andrew Lerner on how the Rent Roll Inc system works," Jan. 19, 1999, 6 pages.
Miscellaneous action from the US Patent and Trademark Office, U.S. Appl. No. 10/209,094, dated Dec. 31, 2007, 4 pages.
News and Events, Factual Data Website Archive 2000, printed Jul. 13, 2007, http://web.archive.org/web20000229152519/http://www.factualdata.com/; 1 page.
Non-final Office Action, U.S. Appl. No. 10/209,094, dated Apr. 5, 2007, 21 pages.
Non-final Office Action, U.S. Appl. No. 10/209,094, dated Sep. 21, 2009, 19 pages.
Patent Cooperation Treaty (PCT) International Search Report, (Form/PCT/ISA/210), US Patent and Trademark Office as International Search Authority, PCT Application No. PCT/US06/29022, Applicant: RentPort, Inc., 3 pages, Mar. 23, 2007.
On-Site.com—Smart screening & online leasing, http://www.on-site.com, 2 pages (c) 2001-2006, printed Oct. 27, 2006.
BlueMoon.com: Forms, solutions for your office or enterprise; http://www.bluemmon.com, 1 page, (c) 2002-2006, printed Oct. 27, 2006.
Vaultware.com: Making It Easy to Lease, http://www.vaultware.com, 1 page, (c) 2006, printed Oct. 27, 2006.
Tenant Reports, Factual Website Archive 2000 printed Jul. 13, 2007, http://web.archive.org/web/20000312022716/www.factualdata.com/tenant.htm; 2 pages.
Uncover What's Behind Happy Face, Far West Credit, Inc. Website Archive 2000, printed Jul. 13, 2007, http://web.archive.org/web/2001012035200/www.farwesr-credit.com/tnt_central.htm, 1 page.
Your Road to the Future, Far West Credit, Inc. Website Archive 2000, printed Jul. 13, 2007, http://web.archive.org/web/20001010032133/http://www.farwest-credit.com/; 1 page.
Credit Retreiver—Sales and Marketing Training Manual, Retriever Product Demo, Jan. 28, 2004, 6 pages.
Non-final office action, U.S. Appl. No. 11/490,616, dated Dec. 8, 2009, 10 pages.
Non-final office action, U.S. Appl. No. 11/490,616, dated Jul. 20, 2010, 10 pages.
Response and Amendment to Dec. 8, 2009 non-final office action, U.S. Appl. No. 11/490,616, dated Jun. 4, 2010, 9 pages.
Notice of non-compliant amendment dated Aug. 6, 2008, U.S. Appl. No. 10/209,094, 5 pages.
Notice of non-compliant amendment dated Jan. 22, 2009, U.S. Appl. No. 10/209,094, 4 pages.
Our Services, Resident Data's Website Archive 2002, http://web.archive.org/web/20021207082323/www.residentdata.com/Services.asp; 11 pages.
Product Sheet Tenant Screening, Far West Credit, Inc. Website Archive 2000, printed Jul. 13, 2007, thhp://web.archive.org/web/2001012609300/www.farwest-credit.com/tnt_products.htm; 1 page.
Response to Apr. 27, 2010, final office action, U.S. Appl. No. 10/209,094, dated Sep. 17, 2010, 18 pages.
Response to Apr. 5, 2007 non-final office action, U.S. Appl. No. 10/209,094, dated Oct. 5, 2007, 65 pages.
Response to Aug. 6, 2008 notice of non-compliant amendment, U.S. Appl. No. 10/209,094, dated Oct. 6, 2008, 5 pages.

(56) References Cited

OTHER PUBLICATIONS

Response to Dec. 31, 2007 miscellaneous action, U.S. Appl. No. 10/209,094, dated Apr. 29, 2008, 12 pages.
Response to Jan. 22, 2009 notice of non-compliant amendment, U.S. Appl. No. 10/209,094, dated Jun. 8, 2009, 9 pages.
Response to Sep. 21, 2009 notice of non-compliant amendment, U.S. Appl. No. 10/209,094, dated Jan. 11, 2010, 19 pages.
Tenant data tapped into by landlords, The San Diego Union, Dec. 4, 1988, 5 pages.
"Move Your Apartment Inventory Online," http://replay.waybackmachine.org/20040122220720/http"//www.vaultware.com, Jan. 2004, 1 page.
"Realty Data Trust: The Online Leasing Experts," http://replay.waybackmachine.org/20050717020250/http://www.vaultware.com, Jul. 2005, 1 page.
"Vaultware: Making It Easy to Lease,"http:replay.waybackmachine.org/20060716123946/http://vaultware.com, Jul. 2006, 1 page, downloaded Mar. 1, 2011.
"Vaultware: Making It Easy to Lease," http://replay.waybackmachine.org/20070329015055/http://vaultware.com, Mar. 2007, 1 page, downloaded Mar. 2, 2011.
Non-final Office Action, U.S. Appl. No. 11/189,024, dated Apr. 28, 2009, 19 pages.
Non-final Office Action, U.S. Appl. No. 11/189,024, dated Dec. 1, 2009, 8 pages.

\* cited by examiner

APPLICANT SCREENING

CROSS-REFERENCE TO RELATED APPLICATION

This application is a continuation of, and claims benefit to, U.S. Non-Provisional patent application Ser. No. 11/490,616 entitled, "Applicant Screening" and filed on 21 Jul. 2006, which is a continuation in part of U.S. Non-Provisional patent application Ser. No. 11/189,024 entitled, "Screening Using a Personal Identification Code" and filed 25 Jul. 2005, now U.S. Pat. No. 8,234,498, both of which are incorporated herein by reference in their entirety.

TECHNICAL FIELD

The invention relates generally to applicant screening, and more particularly to screening an individual or entity using a personal identification code.

BACKGROUND

Applicant screening is an important component in many applicant selection processes, including rental applicant screening, access screening, employee screening, mortgage applicant screening, university entrance screening, etc. Existing approaches may include paper applications and hand-entry of detailed application information by a screener in order to process the application. In an apartment rental scenario, for example, an applicant may fill out a paper application from which the property manager extracts information to submit a credit report request, a criminal background check, and other screening information requests. Based on the results of these submissions, the screener makes a decision regarding the application (e.g., accept, decline, etc.).

For larger institutional property managers, lenders, and employment companies, for example, screening software and systems exist to streamline this screening process. Detailed information extracted from the application can be electronically input by a screener through a computer-based screening service, which can generate a report on requested information (e.g., a credit report, a criminal background report, a lease history report, etc.) collected by a data aggregator. With these reports, the screener can make an informed decision about whether to accept or decline the application and under what terms. However, such computer-based screening services often require substantial training of the screener in order to properly install and configure an account for a computer-based screening service, to ensure the proper information is provided to the screening service (e.g., about the individual applicants) for each screening request, and to ensure that screening results are properly interpreted and applied in the decision-making process.

These existing screening services are often too complex and expensive for smaller businesses, property managers, or other smaller screeners. For example, a property manager who manages only a couple of rental units would likely benefit from access to a computer-based screening service but may not find the training time/costs of using the service itself to be cost effective. As such, smaller property owners are likely to forego the use of such screening services, choosing to screen their applicants using other methods (e.g., credit and criminal data resellers, faxed credit reports, manually calling references & previous landlords, and manually calling former employers).

Existing methods are also more prone to identity theft. The screening services (i.e., those that provide credit reports, criminal background data, and other consumer data) provide consumer-specific data to a screening service subscriber for a permissible purpose based on representations made the screening service subscriber. The screening services perform certain subscription or membership verifications on the requesters to minimize the chance that consumer data could be illegally accessed, but do not normally require consumer confirmation or authorization for each transaction. This practice may introduce avenues for identity thieves to illegitimately access consumer data files. Ideally, a screening service would be required to obtain specific authorization by the consumer (e.g., the screened individual) before providing any access by a screening service subscriber to the consumer's data. However, such a safeguard is not considered viable and so is not employed in the industry.

SUMMARY

Implementations described and claimed herein address the foregoing problems by distributing portions of the screening process to multiple sites and multiple participants and providing a personal identification code that identifies individual sets of screening results. In this manner, the applicant (e.g., a consumer) can enter appropriate applicant profile data into a secure screening account, such as via a screening kiosk (e.g., a computer with network access, a public computer terminal, etc.). The applicant may be authenticated prior to the issuance of a personal identification code. Authentication may be performed by various methods, including without limitation the use of applicant data on file at a data aggregator, biometric mechanisms or some other highly reliable mechanism for ensuring that the applicant granting access is actually the individual or entity authorized to grant access to the applicant's information.

The applicant can authorize the generation of screening results, which are associated with a unique personal identification code. This code can then be communicated to the screener, who can access the screening results along with a recommendation, if desired, by sending the code to a screening service provider. Based on the screening results, the screener can make a decision about the application and communicate to an applicant which action will be taken on his or her application. Communications among the various participants and components, including without limitation the application, the screener, the screening server, the screening kiosk, and one or more screening services, can take place via the internet and/or other communications media.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

In one implementation, a method of screening may comprise receiving a selection of screening services and an applicant profile that identifies an applicant. The screening continues by generating screening results specified by the selection of screening services based on the applicant profile. The screening then continues by notifying the property manager that the screening results are available for the applicant based on the applicant profile. The screening results are then provided to the property manager based upon the applicant profile.

In another implementation, a computer program product on a computer-readable medium, for use in a data processing system for executing a computer program, comprises: i) receiving a selection of screening services and an applicant profile that identifies an applicant; ii) generating screening results specified by the selection of screening services based on the applicant profile; iii) notifying a property manager that screening results are available for the applicant based on the applicant profile; and iv) providing the screening results to the property manager based on the applicant profile.

In one implementation, a system for screening may comprise a communications module, a screening module, a notification module, and a service module. The communications module receives a selection of screening services. A screening module receives an applicant profile to identify an applicant and generate screening results, specified by the selection of screening services, based upon the applicant profile. A notification module notifies a property manager that screening results are available for the applicant based upon the applicant profile. A service module provides the screening results to the property manager based upon the applicant profile.

In one implementation, a method of using screening services may comprise receiving a communication from a screening server, the communication being associated with an applicant profile entered by an applicant. The method then continues by providing a request to the screening service for screening results generated based upon the applicant profile. The method then comprises, receiving, from the screening server, screening results associated with the applicant.

Other implementations are also described and recited herein.

BRIEF DESCRIPTIONS OF THE DRAWINGS

DETAILED DESCRIPTION

Exemplary applicant screening systems and services, which can provide screening results about a consumer, allow consumer applicants and screeners to securely and efficiently generate and communicate application requests, screening parameters, screening results, and application results (e.g., screening decisions) via a communications network. Such systems and services may be employed in a variety of screening contexts, including without limitation criminal, credit, and lease history screening for employment applicants, leasing applicants, and any other consumer applicants or persons of interest.

Figure 1:
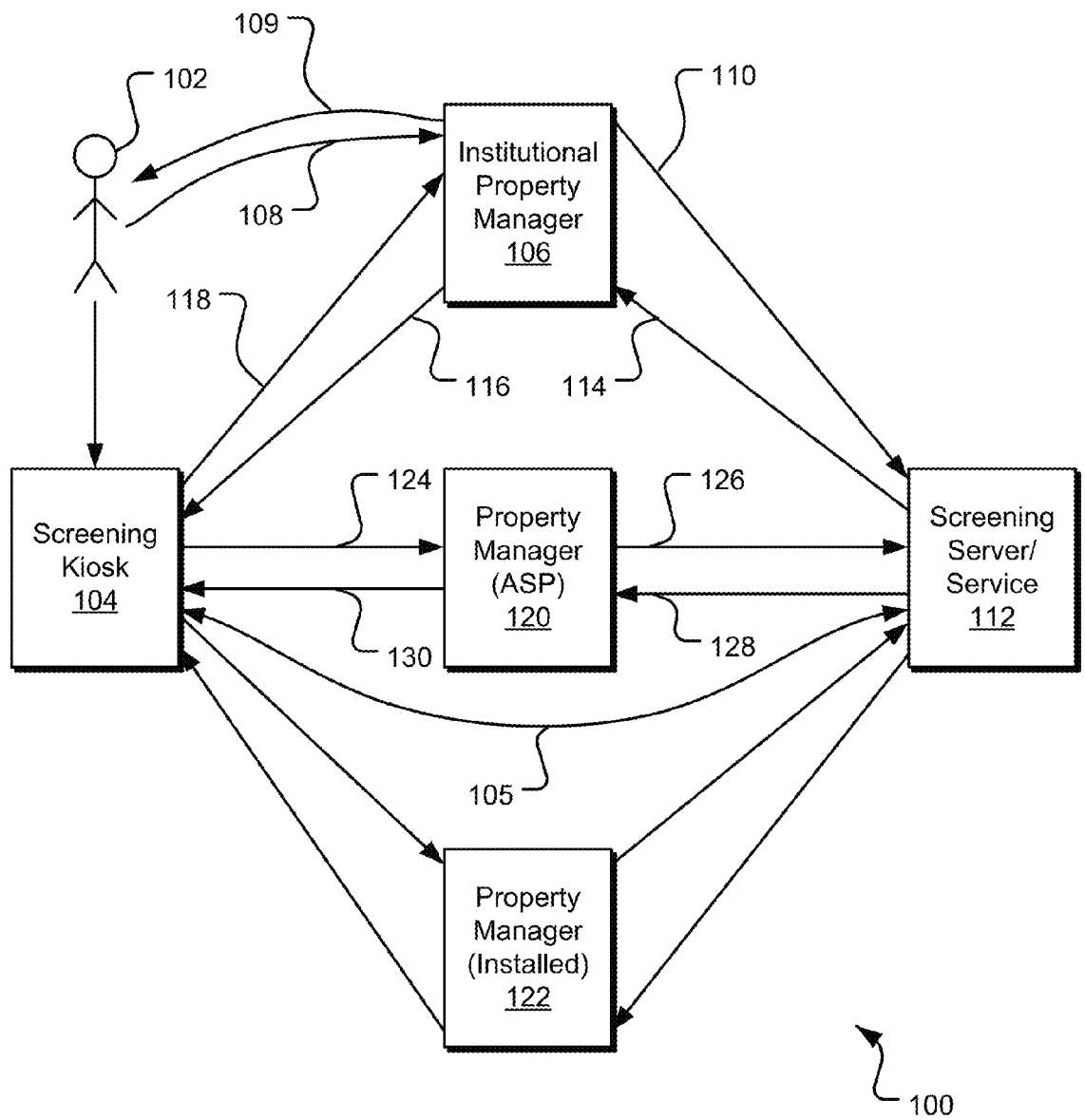
FIG. 1 illustrates an exemplary system for screening applicants.

FIG. 1 illustrates an exemplary system 100 for screening applicants. An applicant 102 accesses a screening kiosk 104, a web site, or another system access point. Such systems can be implemented on one or more computer systems or kiosks, including network-connected personal digital assistants (PDAs), cell phones, laptop computers, palm-based computers, desktop computers, and servers.

An institutional property manager 106 represents a class of property managers with sufficient volumes of property rentals to justify sophisticated applicant screening systems. Common characteristics of institutional property managers may include specially-trained screening personnel, customized screening procedures and parameters across multiple rental locations, a high-speed internet connection, professional management, a need for management reporting across multiple rental locations, a desire for a dedicated account agent at the screening service to manage the institutional property manager's account, and other characteristics. Typically, the property managers in this class subscribe to one or more screening services, train screening personnel to use the screening service(s) and to understand screening results, and interact closely with the screening service(s) to optimize their rental business.

In one scenario with an institutional property manager 106, an applicant 102 completes a rental application 108. Screening personnel of the institutional property manager 106 receives the rental application 108 and inputs relevant data 110 into a screening application, web-based form, or other form for submission to one or more screening services or data aggregators. In some circumstances, the data 110 is submitted to a screening service or data warehouse (e.g., a credit bureau) via facsimile. In other circumstances, the data 110 is submitted electronically through a dial-up connection or internet connection. Screening results 114, including possibly recommendations by the screening service, are returned to the institutional property manager 106 and are evaluated by the screener. Recommendations are typically generated based on a screening model and the available screening results. Exemplary recommendations may include without limitation "accept", "decline", "accept with increased deposit", "more information needed", etc. Based on this evaluation, the institutional property manager 106 can determine and communicate an applicant action 109 (e.g., a screening decision) to the applicant 102 (e.g., by mail or telephone). Exemplary applicant actions may include without limitation an offer of acceptance, a declination, a request for more information, or other responses.

In an alternative scenario, an institutional property manager 106 may accept a personal identification code 118 (e.g., a personal identification number or PIN) from an applicant 102 in order to obtain screening results 114 for the applicant 102. In this scenario, the applicant 102 may obtain the personal identification code 118 from the screening kiosk 104. If the applicant 102 does not already have an account with the system 100, he or she is given the opportunity to create a new account by providing applicant profile information, which may include without limitation identification information, a login ID, a password, and other data. The applicant 102 is authenticated by the system through the use of one or more authentication mechanisms within the screening kiosk 104, which may also including communication with the screening server/service 112 or other consumer-authenticating information. One method involves use of a fraud management platform that authenticates an applicant through a series of questions that only the applicant would be likely to know. Exemplary questions may include demographic questions, such as "On which of these streets have you lived previously?", or credit questions, such as "What is the current balance of your first mortgage?" If an account already exists, the applicant 102 is given the opportunity to log into his or her account via the screening kiosk 104. It should be understood that other system access points may be used for this purpose as well.

Personal identification codes may be limited to a single use or a limited number of uses, for use by a single screener, or for a limited period of time. For example, a screener may have up to three uses of the personal identification code over the course of a week to review the applicant's screening results before the personal identification code is no longer valid.

The screening kiosk 104 communicates the applicant profile to a screening server 112 via a communications link 105. The screening server 112 represents a computer system of a screening service or multiple computer systems at multiple screening services. In one implementation, a single server 112 acts as a centralized screening service by requesting, receiving, and processing screening results from other screening services. For example, one screening service may provide a request, with appropriate applicant data, for a credit report from a credit bureau. The same screening service may also provide a request, with appropriate applicant data, for a criminal background check from a criminal records database service.

Through the screening kiosk 104, the applicant 102 can then select (and possibly pay for) the types of screening results 114 he or she wishes to be made available to the property manager 106. In another implementation, the types of screening results may be selected by the property manager 106. Based on the applicant profile and the screening selections made by the applicant 102 and sent to the screening server 112 via the communications link 105, the screening server 112 accesses one or more data warehouse sources (e.g., credit bureaus, criminal records databases, leasing history databases, etc.) to obtain selected screening results 114 and associates a personal identification code 118 (e.g., a PIN) with the screening results 114. The personal identification code 118 is then communicated to the applicant at the screening kiosk 104 via the communications link 105 after the applicant 102 is authenticated via an authentication technique embedded in the system 100. Selected results from the screening results may also be communicated to the applicant via the screening kiosk 104.

The applicant 102 can communicate the personal identification code 118 to a property manager 106 via email, via other electronic communication means, or manually. Given the personal identification code 118, the property manager 106 can access the selected screening results 114. In some circumstances, the screening results 114 may also include one or more recommendations received from the screening service(s). Based on the screening results, including possibly the recommendation(s), the property manager 106 can determine an applicant action 116 and communicate it to the applicant 102 electronically or manually.

As discussed previously, some property managers manage property portfolios that are smaller than that of what would normally be considered an institutional property manager. Nevertheless, such property managers would benefit from professional screening. A personal identification code implementation of a screening system 100, however, can offer such property managers an attractive alternative access to such services.

In one implementation, a property manager 120 or 122 has a dial-up or high-speed internet connection, or some other network communications link to a screening service or server 112. The property manager 120 uses an Application Service Provider (ASP) configuration to interact with the screening server 112 through a client computer. ASP-products can be accessed from a server via a web browser and typically do not require any other special software to be installed on the client computer. In this configuration, the applicant 102 obtains a personal identification code 124 after authentication through the system 100 and communicates it to the property manager 120 (e.g., by email or manually). The property manager 120 can use the personal identification code 124 to access the screening server 112 and obtain screening results 128 about the applicant 102. The screening results 128 may also include recommendations. The property manager 120 can provide the applicant action 130 directly to the applicant 102 (e.g., via phone call or email) or can respond through the screening server 112, such that the applicant 102 can view the applicant action 130 at his or her next login to the screening account.

In one implementation, the applicant 102 can direct that the property manager 120 to receive the screening results 128 electronically. For example, the property manager 120 may receive an email with a link to the applicant's screening results at the screening server 112. In this scenario, the property manager 120 may be asked if he or she would like to create an account on the screening server 112 in order to more easily access other screening results. Alternatively, if the property manager 120 already has an account on the screening server 112, the property manager 120 may be notified of the screening results 128 both by email and when they log into the account.

The property manager 122 uses a desktop-installed application (e.g., a screening-specific software package purchased through a direct or retail channel, a screening feature integrated into another direct or retail software package, etc.) to interact with the screening server 112 through a client computer. This configuration may include, for example, a small business accounting package with an applicant screening feature that manages communications with the screening server 112 or opens a browser to allow ASP-type interaction with the screening server 112.

In a manner similar to that of the ASP configuration, the property manager 122 receives notification of screening results of an applicant. The property manager 122 access the screening server 112 to access the screening results (e.g., by submitting the applicant's PIN or following a link to the screening server). One advantage of the "installed" configuration is bundling the PIN-based screening feature with other business packages can provide more effective marketing channels. In addition, integration with such packages can also allow the various business features to work together. Finally, an "installed" software package may be sold in retail settings, thereby providing an alternative marketing platform as compared to an online ASP configuration.

Figure 2:
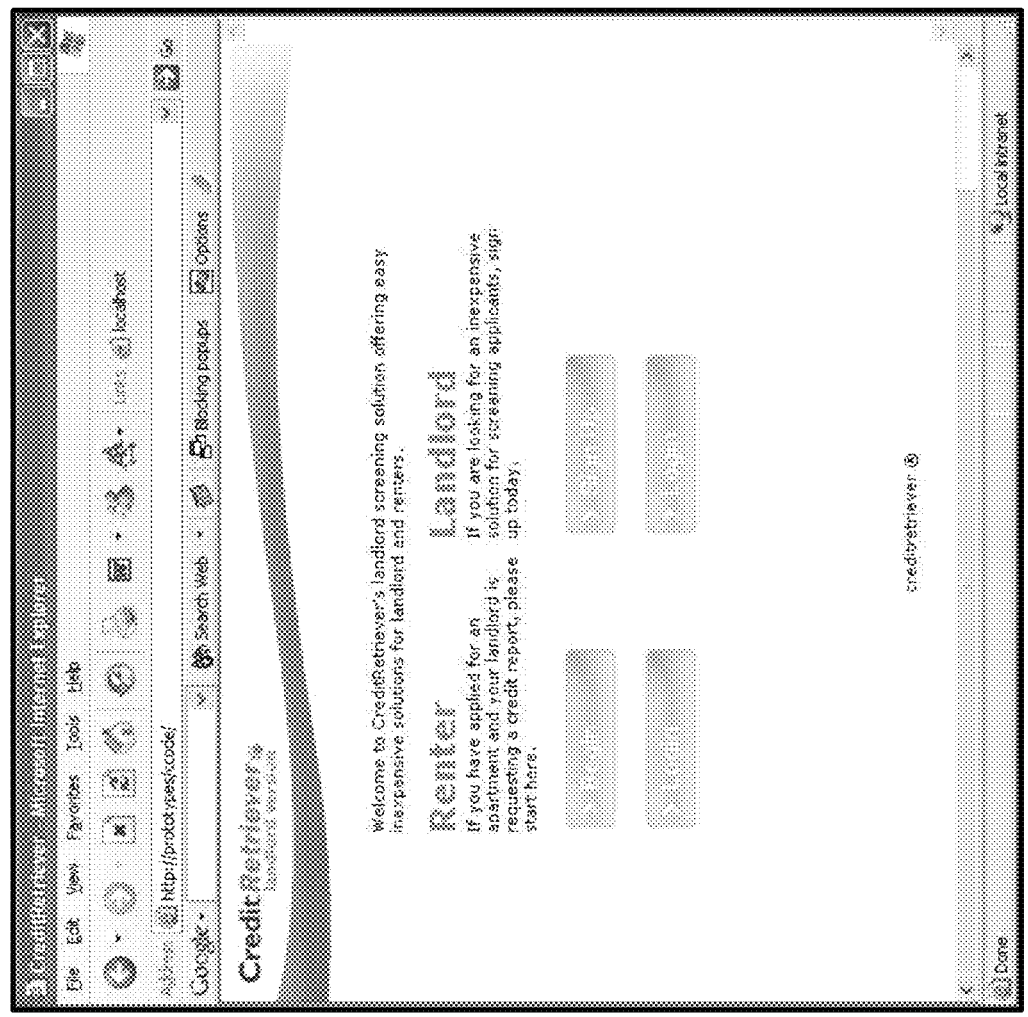
FIG. 2 illustrates a "Welcome" screenshot from an exemplary system for screening applicants.

FIG. 2 illustrates a "Welcome" screenshot 200 from an exemplary system for screening applicants. An applicant (e.g., a renter) has a choice of creating an account ("Begin") or logging into an existing account at a screening kiosk or other access point. A property manager (e.g., a landlord) has a choice of creating an account ("Sign Up") or logging into an existing account at a web site or application screen. Exemplary system flows for both applicants and property managers are described with regard to the following figures.

Figure 3:
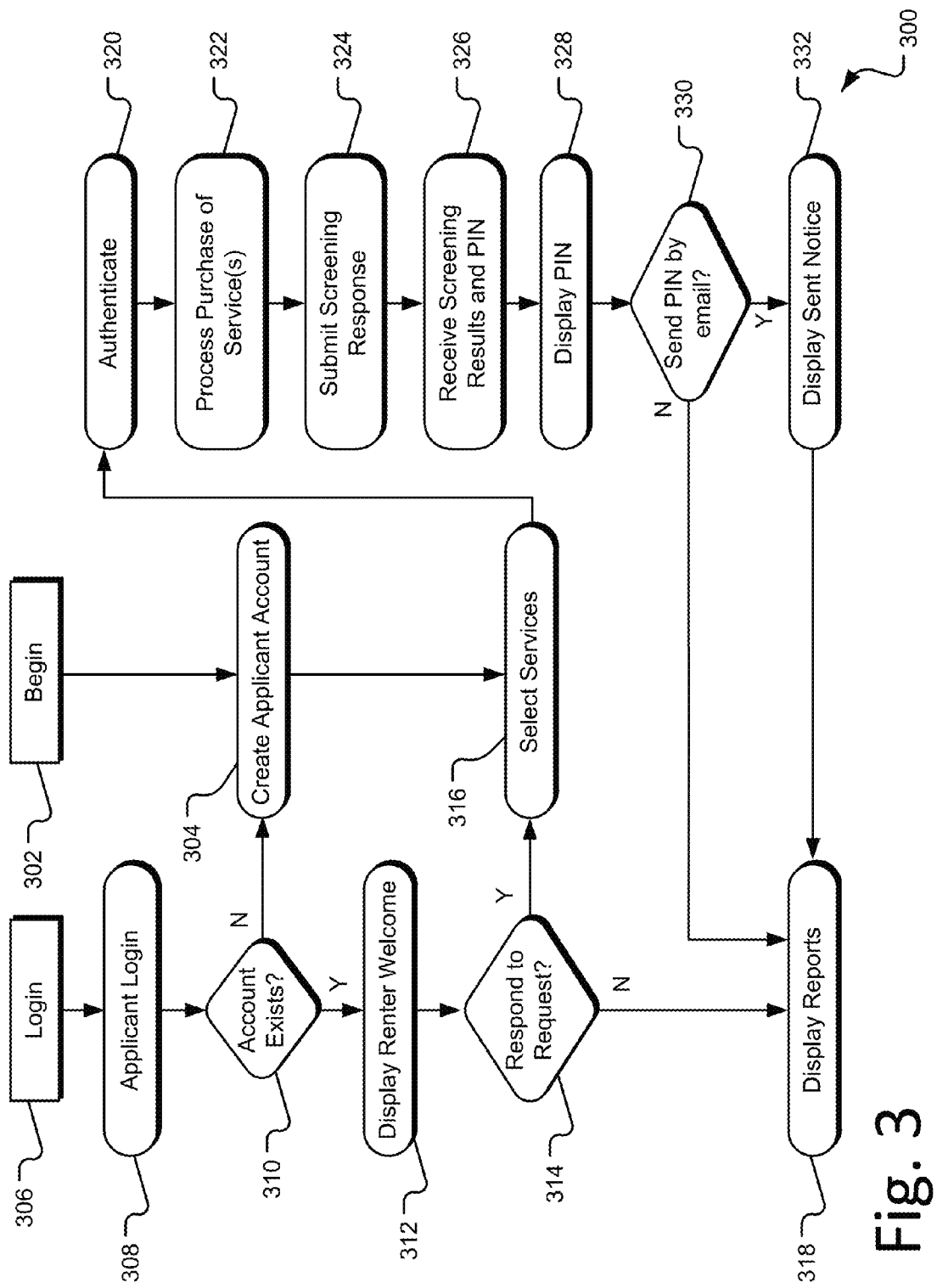
FIG. 3 illustrates exemplary operations for processing an applicant's use of an applicant screening system.
Figure 4:
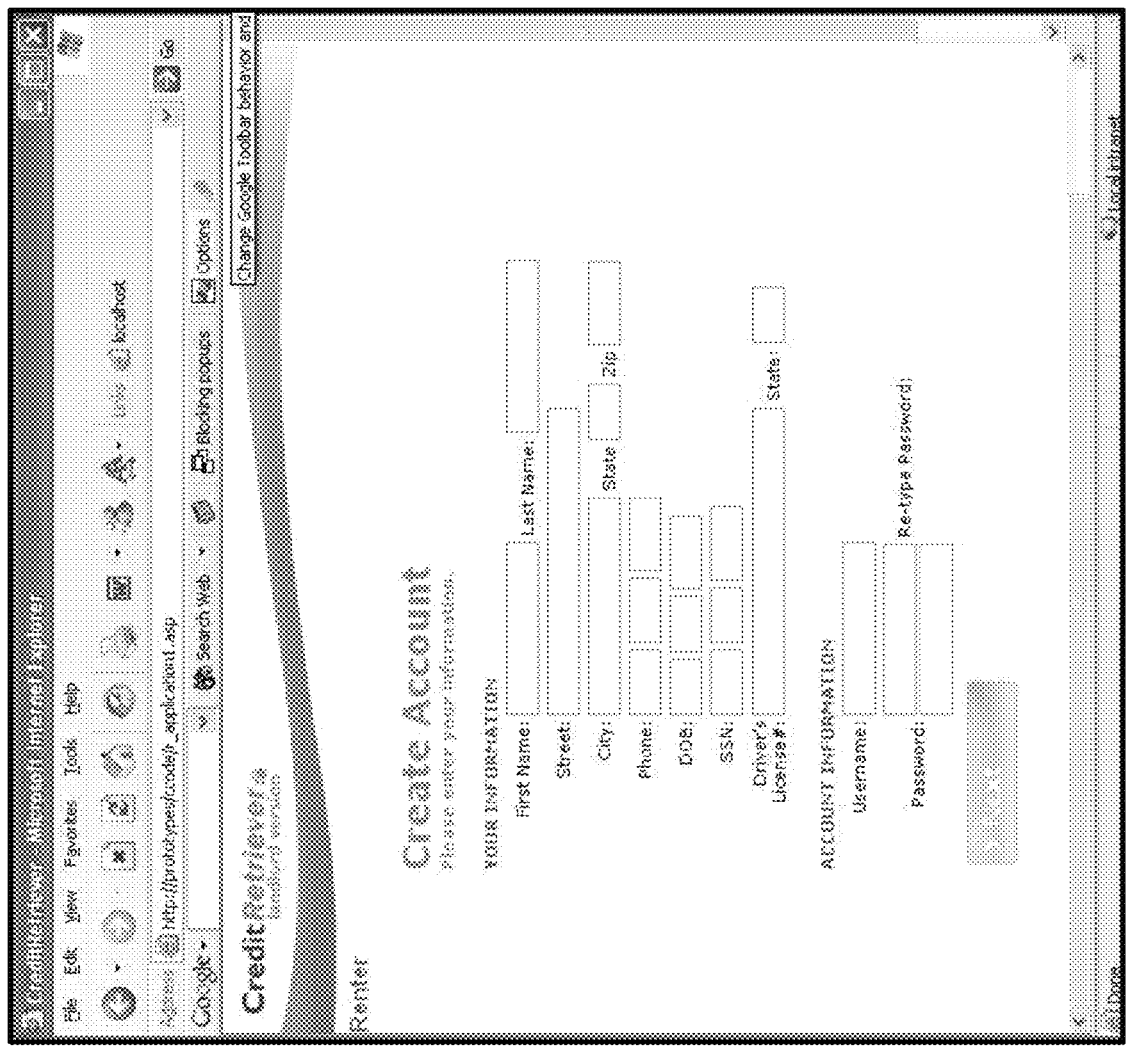
FIG. 4 illustrates a screenshot for creating an applicant's account in an exemplary applicant screening system.

FIG. 3 illustrates exemplary operations 300 for processing an applicant's use of an applicant screening system. In an account creation operation 304, if the applicant selects the Begin option 302 at the Welcome screen, the applicant can enter relevant identification, login, and password information, and any other information (collectively, "application profile information") useful in screening applicants. An exemplary Create Applicant Account screen 400 is illustrated in FIG. 4. In one implementation, the applicant may terminate the process after creating an account, so that he or she may return at a later time to use the service.

If the applicant selects the Login option 306, an applicant is given the opportunity to log into the screening kiosk (e.g., is prompted for a login identifier and a password) in a login operation 308. If the login fails, as judged by a decision block 310, the applicant is directed to the account creation operation 304. After the applicant has created an account, he or she will not have any requests from landlords yet so the applicant is directed to a service selection operation 316 (see screenshot 500 in FIG. 5).

Figure 6:
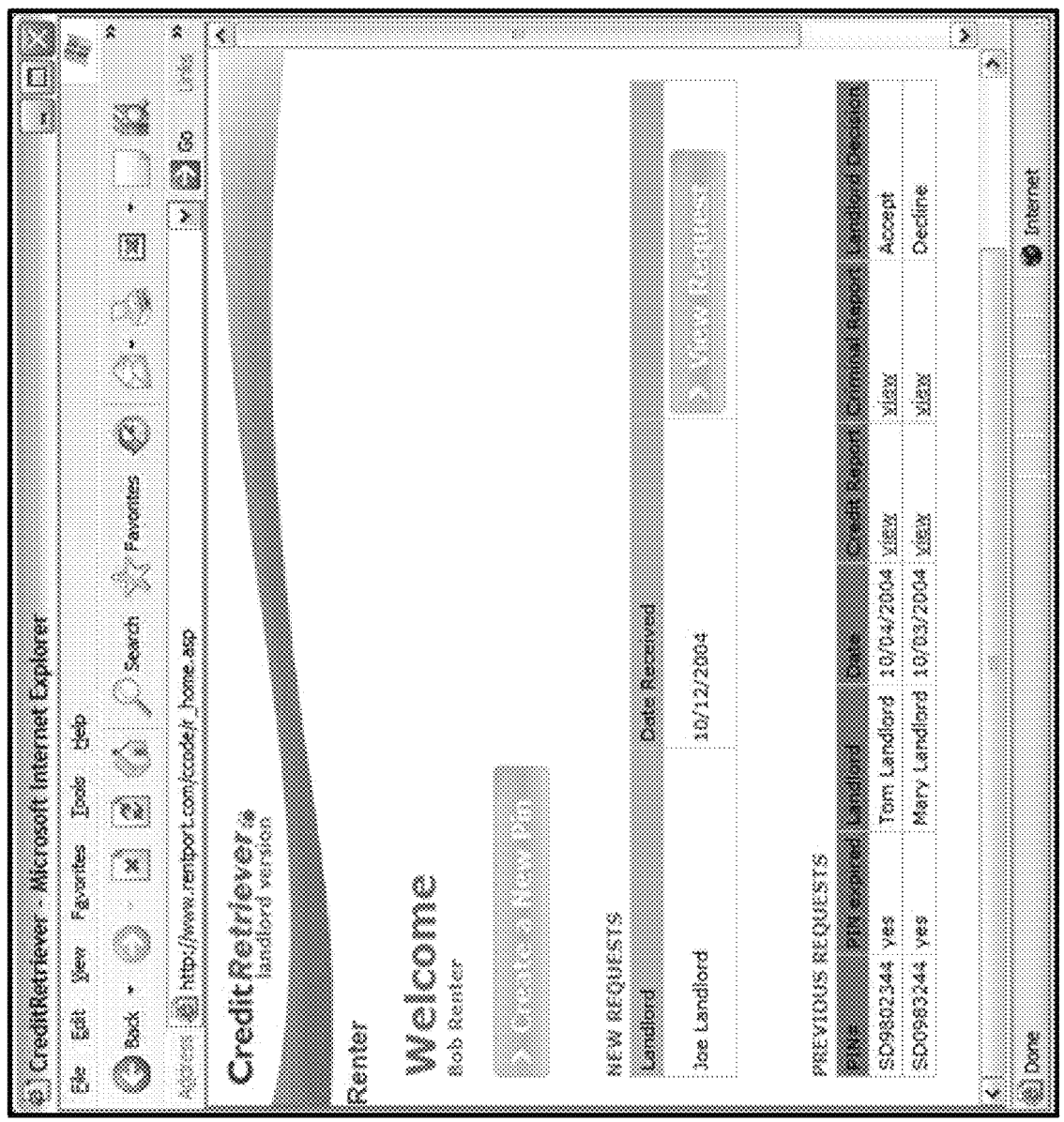
FIG. 6 illustrates a screenshot allowing an applicant to review application results and to initiate a new application in an exemplary applicant screening system.

After login, a Renter Welcome screen (see screenshot 600 in FIG. 6) is displayed to the applicant in a display operation 312, which presents a list of application requests (e.g., from landlords) and available results of application requests (e.g., also from landlords). An application request may include without limitation a request from a landlord, loan officer, etc. requesting that the applicant provide certain background data (e.g., credit data, leasing history, criminal background data, etc.). A result typically includes the response to the application, such as "accepted", "declined" or "more information is required", although other responses are also contemplated. In addition, if the applicant is declined, the screening results on which the declination is based is available for viewing by the applicant (e.g., via hyperlinks to the corresponding reports).

Figure 7:
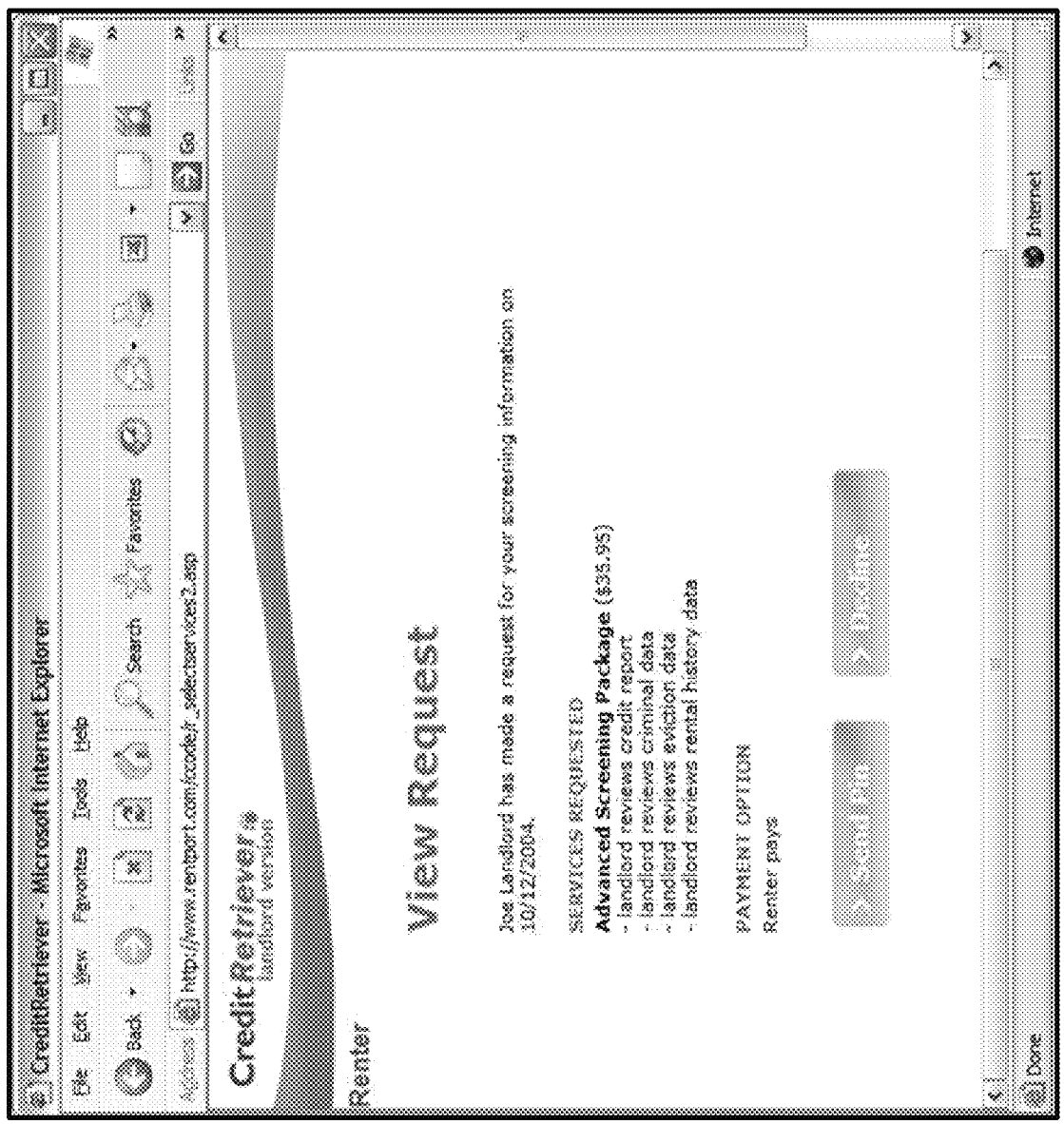
FIG. 7 illustrates a screenshot allowing an applicant to view requests for screening information in an exemplary applicant screening system.

If the applicant wishes to view a new request from a landlord, a respond operation 314 may be activated through the Renter Welcome screen. The applicant can choose to view reports from previously processed requests in a viewing operation 318, or by selecting "View Request", the applicant can view the screening information requested by a new landlord (see screenshot 600 in FIG. 6). Based on the information provided in a "View Request" screen (see screenshot 700 in FIG. 7), the applicant can choose to send a personal identification code to the landlord to authorize the landlord's access to the requested information or the applicant can choose to decline the landlord's request. To provide the requested information, the system directs processing from the View Request screen to a service selection operation 316.

Figure 5:
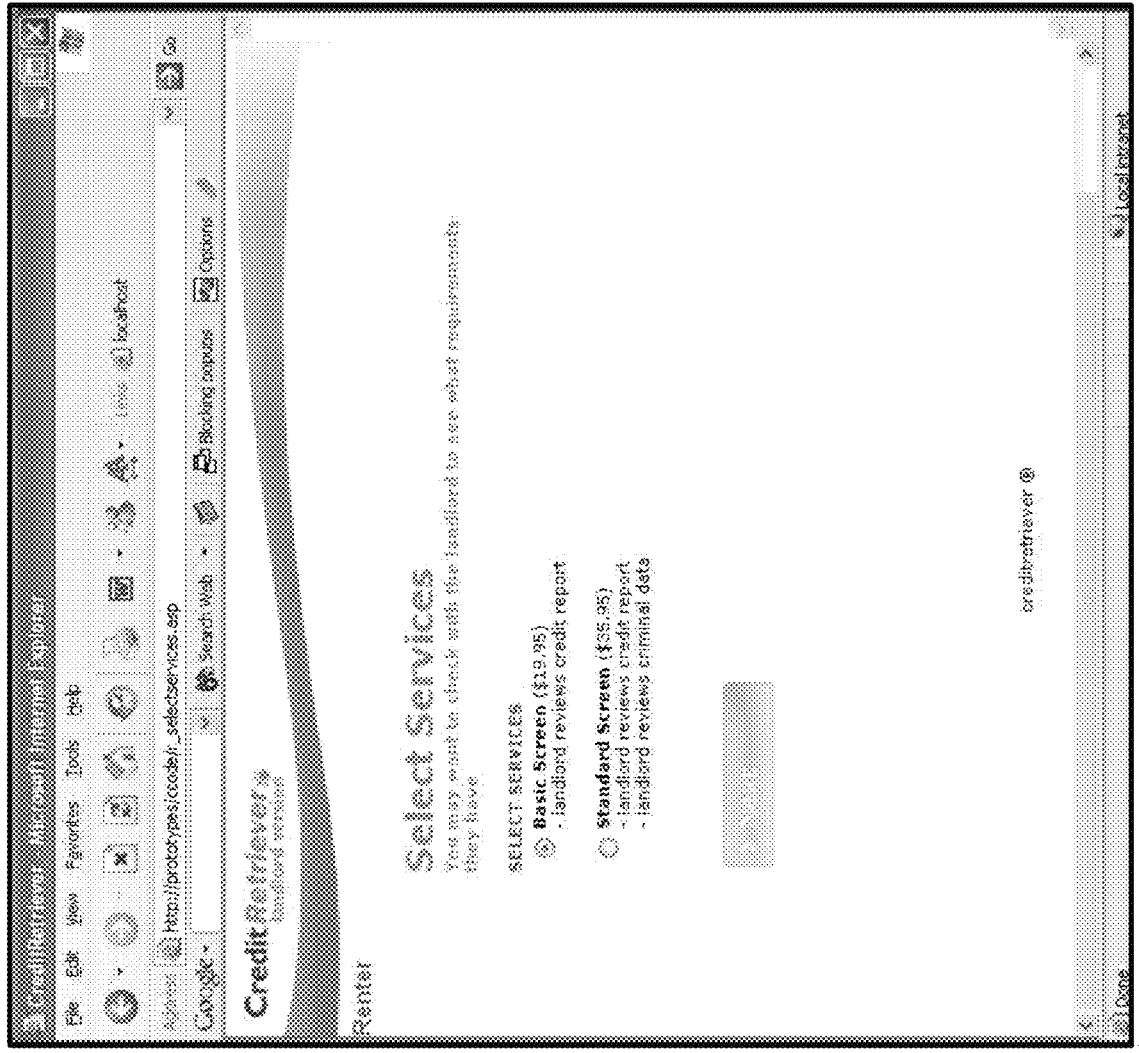
FIG. 5 illustrates a screenshot allowing an applicant to select screening services in an exemplary applicant screening system.
Figure 8:
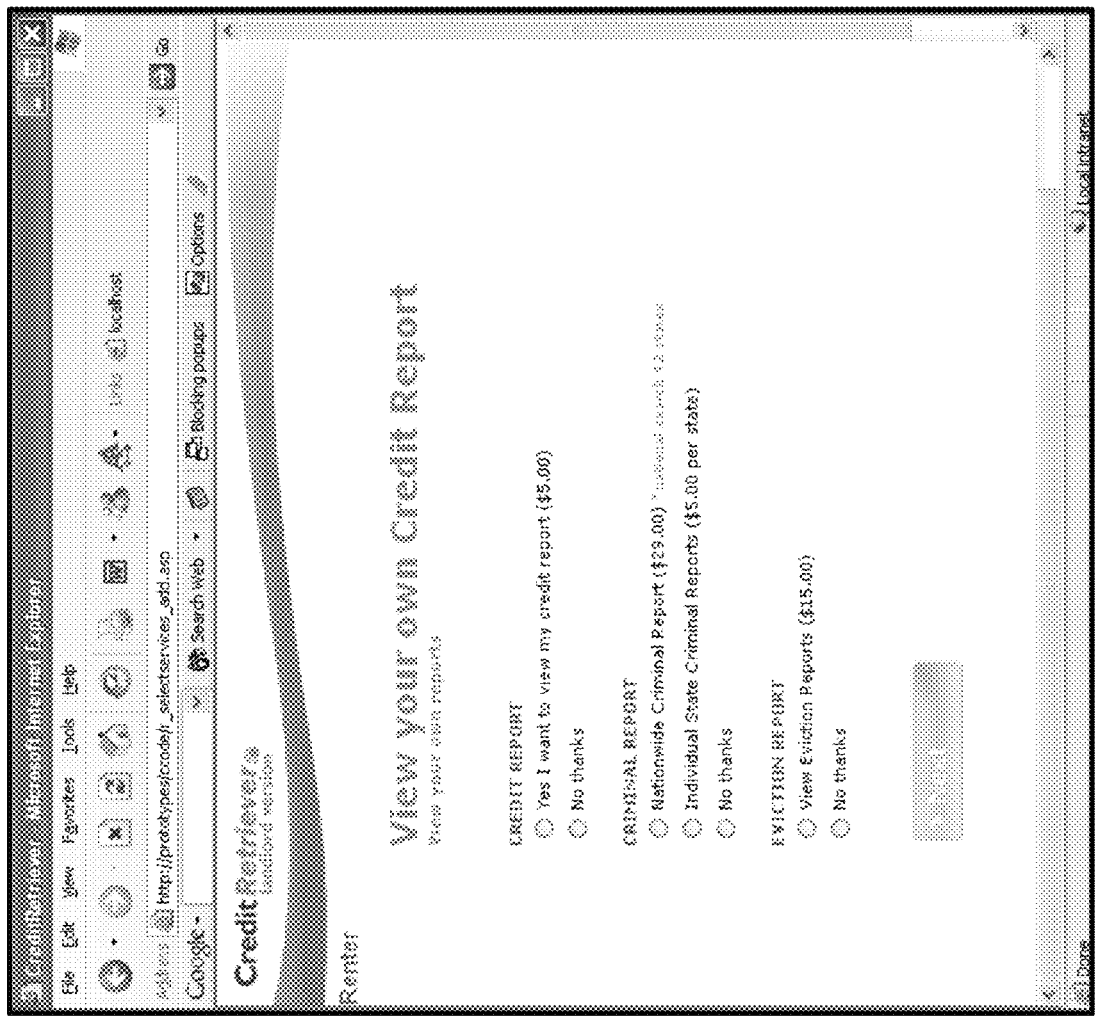
FIG. 8 illustrates a screenshot allowing an applicant to access screening information in an exemplary applicant screening system.

If the applicant wishes to respond to a new request or otherwise obtain a new personal identification code, the service selection operation 316 allows the user to select the types of screening services desired. While the screenshot 500 of FIG. 5 show only two options, any number of screen options and combinations thereof are contemplated. Services may be paid for by the applicant or by the landlord. The consumer may pay for the service, the landlord could pay for the service, or the two parties could share the costs. Such choices may be made available to the consumer during be available during enrollment. In one implementation, for example, the consumer may choose to pay for the data upfront and reduce the cost of making multiple applications. In addition, the applicant may choose to purchase and view his or her own screening results (see screenshot 800 of FIG. 8).

In one implementation, the applicant is authenticated for each grant of access (e.g., each transaction sending a personal identification code to a screener). Accordingly, in authentication operation 320, the screening server authenticates the applicant. Authentication may be performed according to a variety of techniques. An exemplary authentication may include a series of questions to which only the consumer would presumably know, such as specific information about their credit file. Other authentication methods may include without limitation biometric tests at the kiosk (e.g., fingerprint or retinal verification) and credit card or driver's license scanning. If the consumer fails the authentication for any reason, the service may be altered or terminated. For example, a personal identification code would only be issued via the U.S. Mail to the address held by the data warehouse for the requesting applicant.

Figure 9:
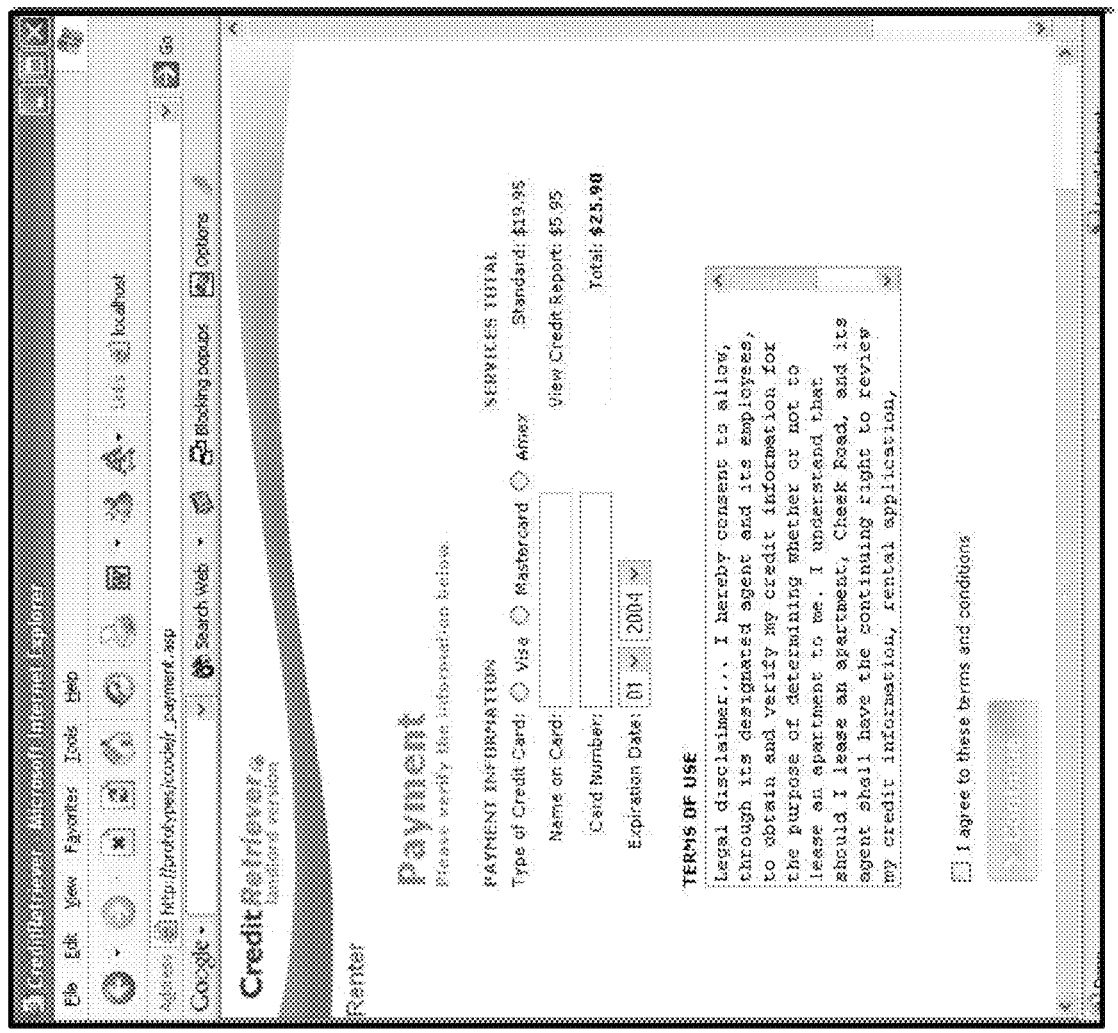
FIG. 9 illustrates a screenshot allowing an applicant to pay for applicant screening-related services in an exemplary applicant screening system.

If the applicant is paying for screening service(s), a processing operation 322 accepts payment information (e.g., credit card information) to process the purchase. (See screenshot 900 of FIG. 9.) Alternatively, the kiosk could support one or more currency acceptors that can receive and validate cash from the applicant. If only the landlord is paying or has paid for screening service(s), then the processing operation 322 may be skipped. A submission operation 324 submits the applicant profile information and service selections to the screening server via a communications channel, such as the internet. The screening server receives the application information and service selections (e.g., leasing history screening results, criminal background screening results, etc.) and performs the selected screening operations.

Figure 10:
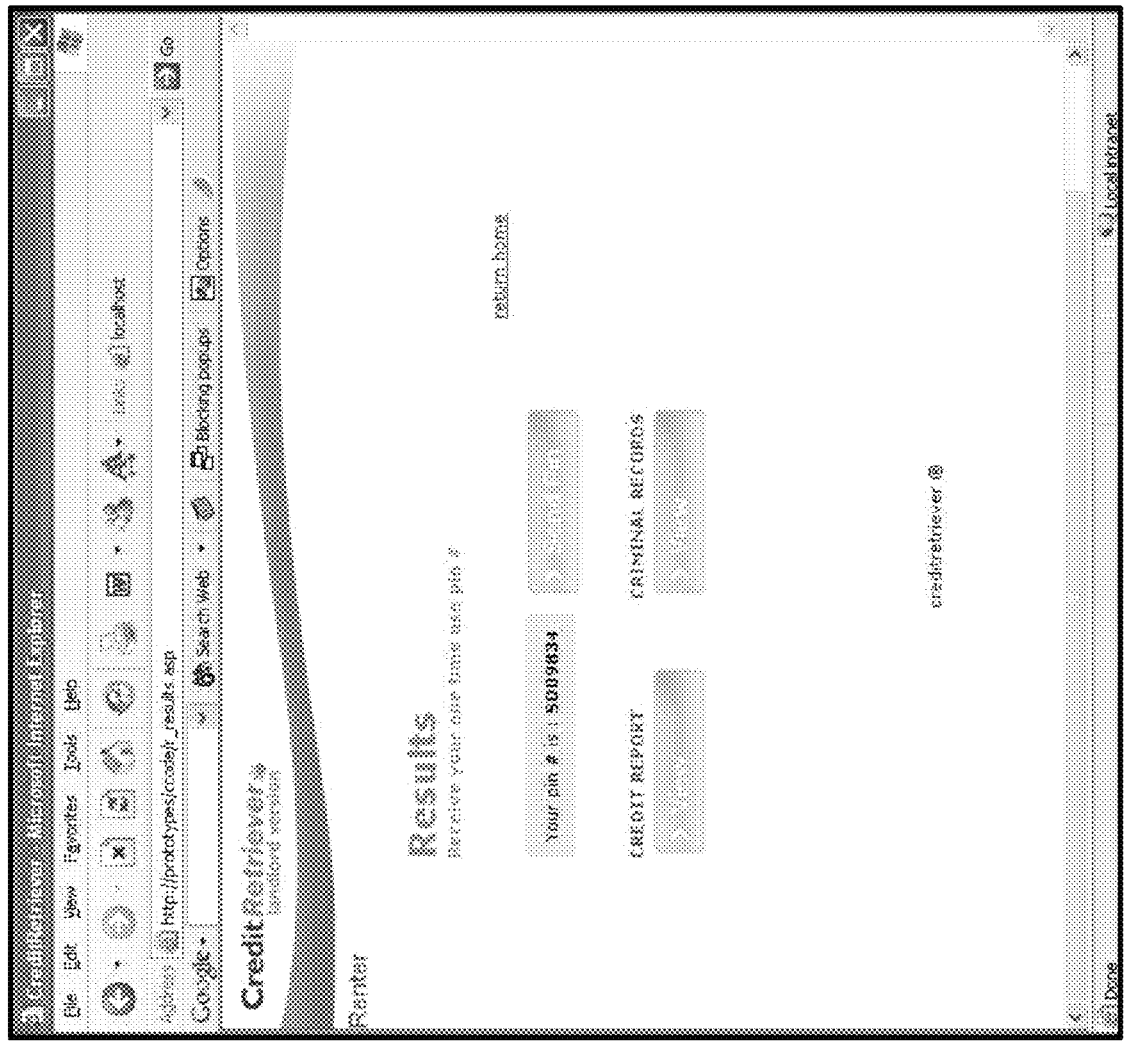
FIG. 10 illustrates a "Results" screenshot in an exemplary applicant screening system.
Figure 11:
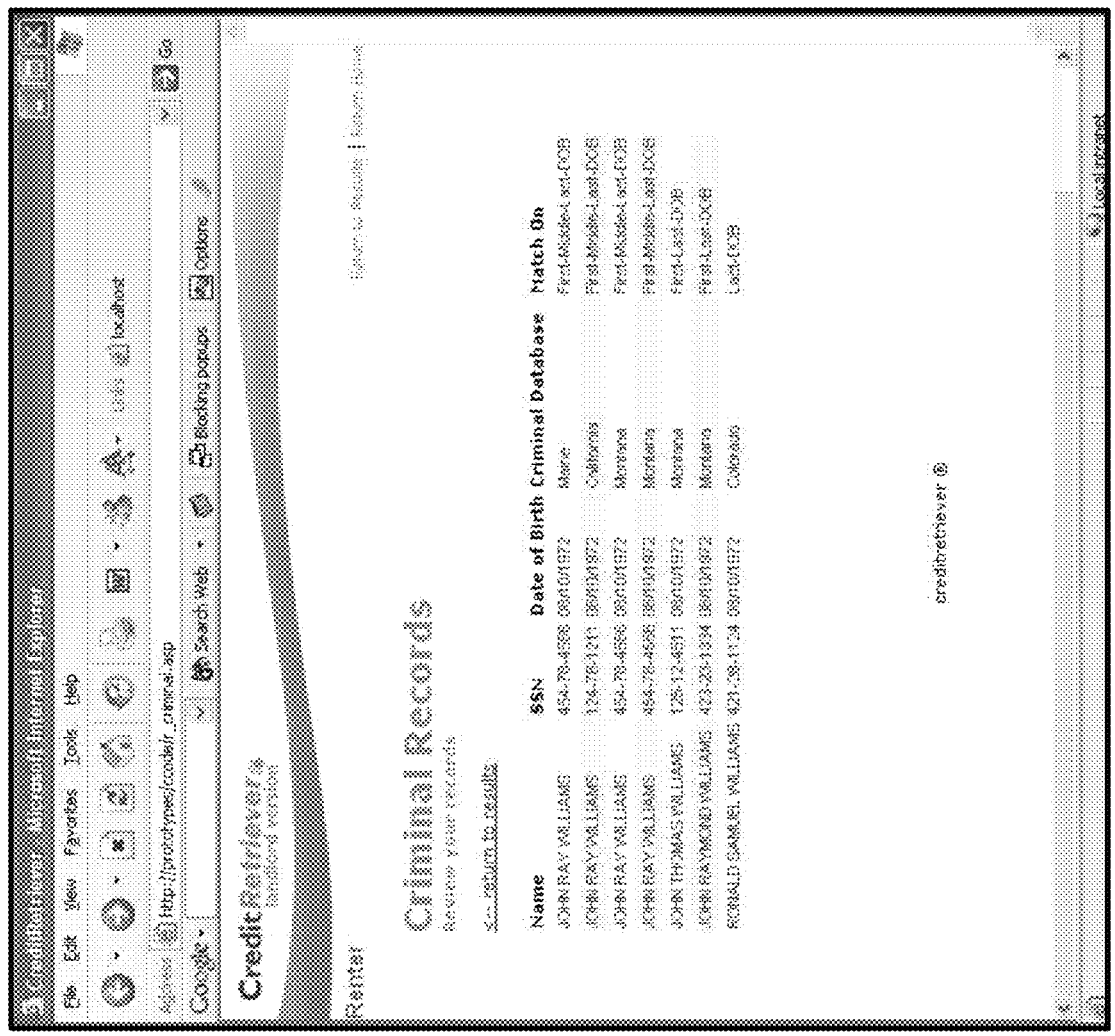
FIG. 11 illustrates a screenshot displaying criminal record selections of an applicant in an exemplary applicant screening system.
Figure 12:
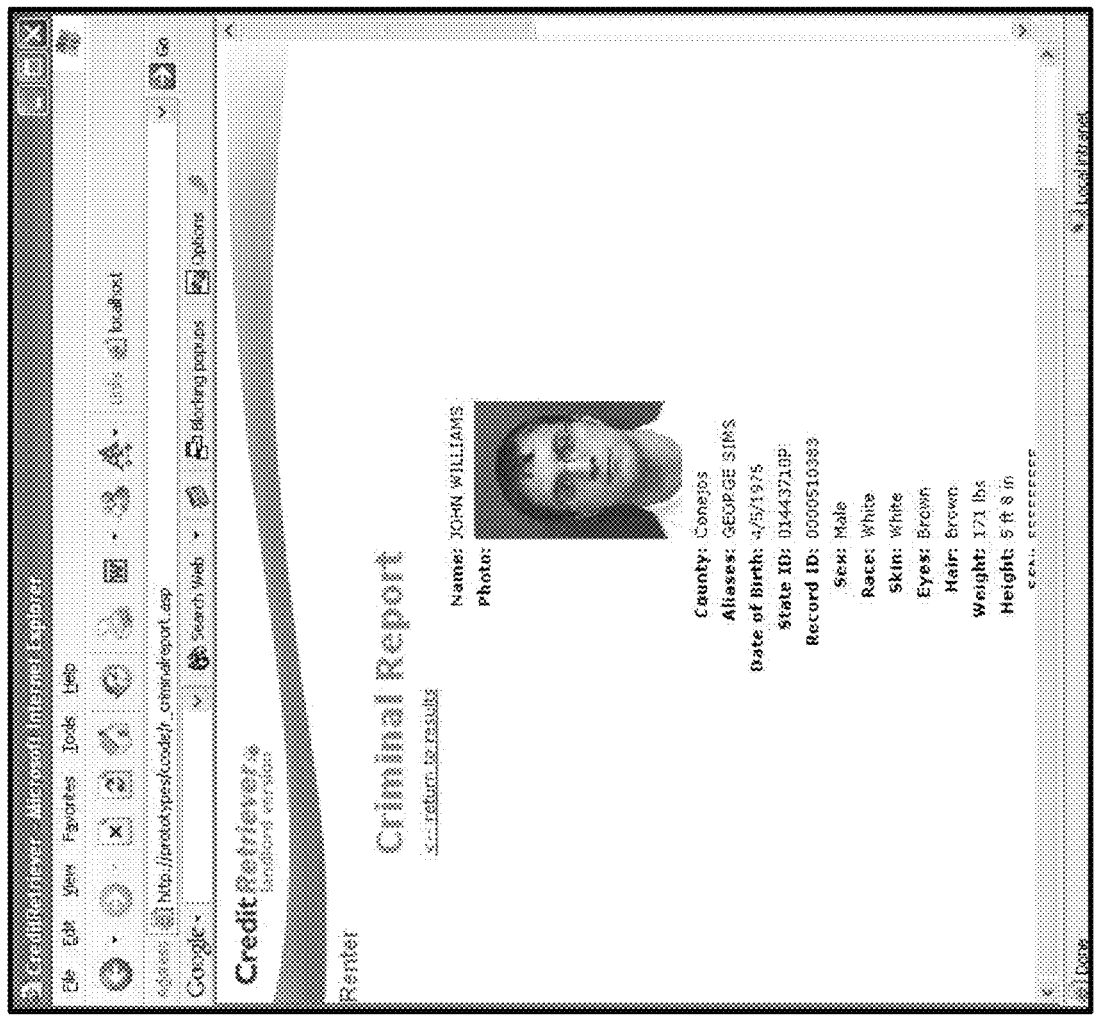
FIG. 12 illustrates a screenshot displaying detailed criminal record information of an applicant provided by an exemplary applicant screening system.
Figure 13:
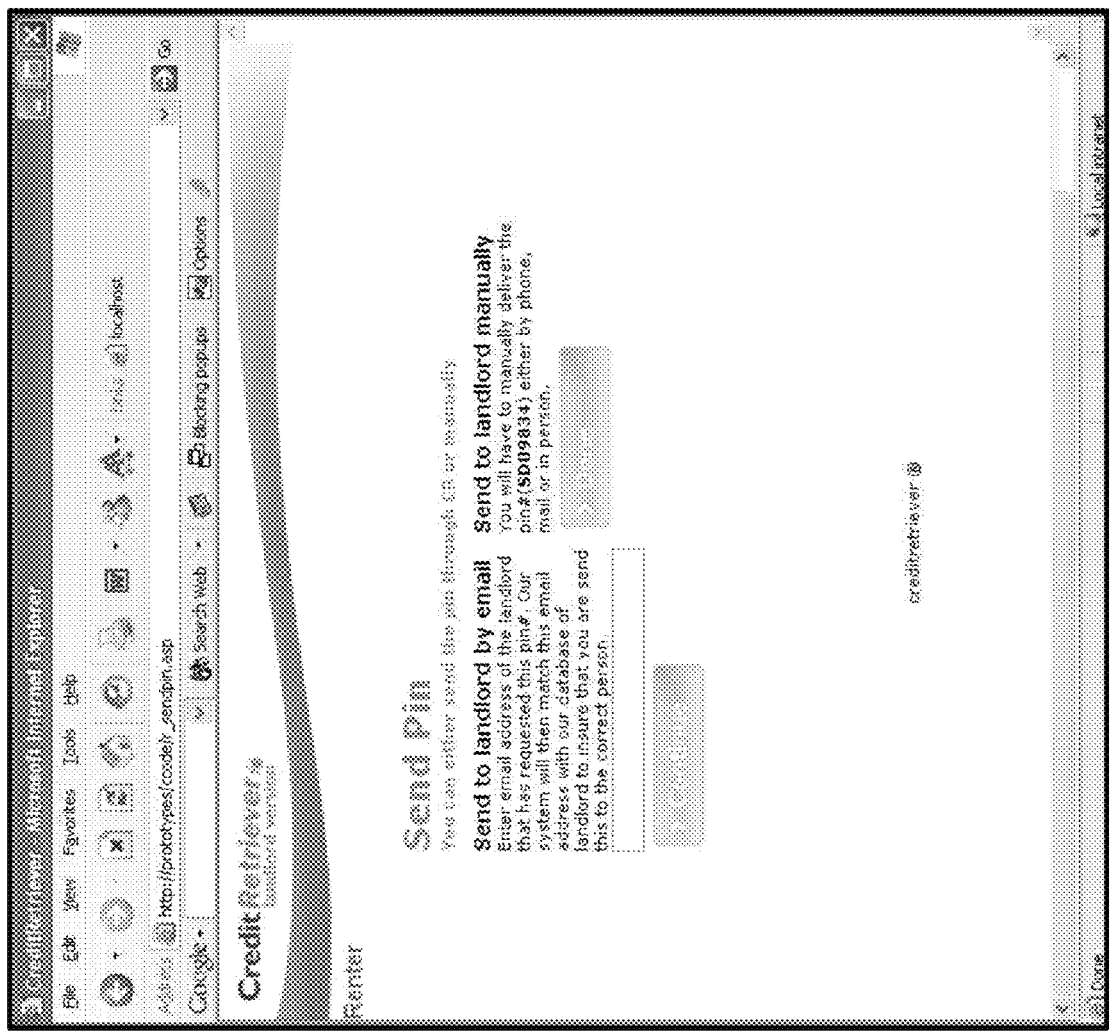
FIG. 13 illustrates an exemplary screenshot allowing an applicant communicate his or her personal identification code to a landlord.
Figure 14:
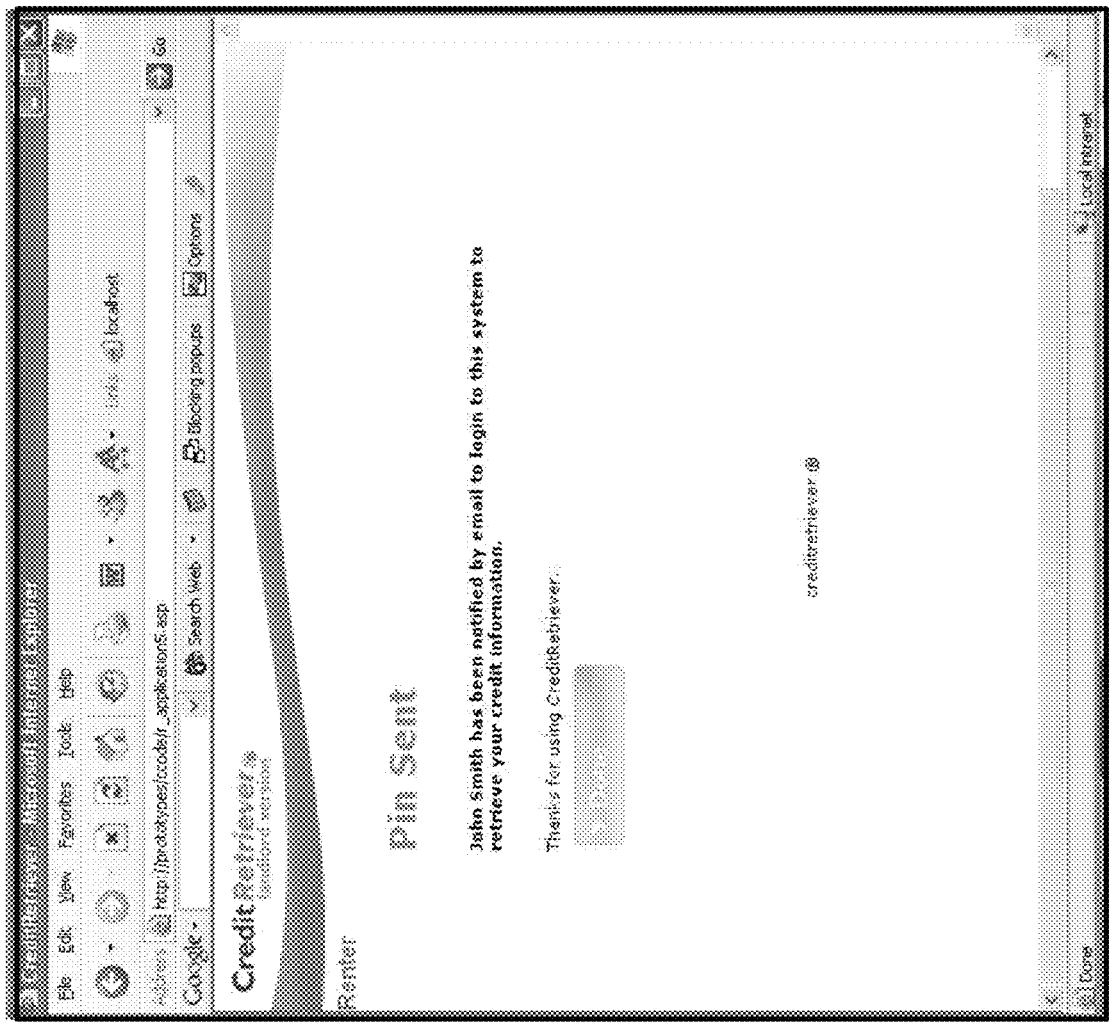
FIG. 14 illustrates a screenshot indicating a personal identification code communication in an exemplary applicant screening system.

In one implementation, as shown in the Results screenshot 1000 of FIG. 10, a personal identification code is displayed to the applicant. The applicant is also given choices of viewing various screening reports (e.g., credit report, criminal records, leasing history, employment history, etc.) and sending the personal identification code or "PIN" to a landlord. The PIN and other results options are displayed in a display operation 328. If the user selects "Send PIN" from the Results Screenshot 1000 of FIG. 10, then the applicant is offered the opportunity in a decision operation 330 to send the PIN to a landlord by entering an email address, or to send the PIN to the landlord manually (e.g., by phone, mail, facsimile, in person, etc.). If the applicant chooses to send the PIN by email, the PIN is sent to the email address specified by the application (see screenshot 1300 of FIG. 13) and a send notice is displayed in a display operation 332 (see screenshot 1400 of FIG. 14). Before or after operation 330 and/or operation 332, the applicant can view the returned screening reports in the display operation 318. Exemplary screening reports are displayed in screenshots 1100 and 1200 of FIGS. 11 and 12, respectively.

Figure 15:
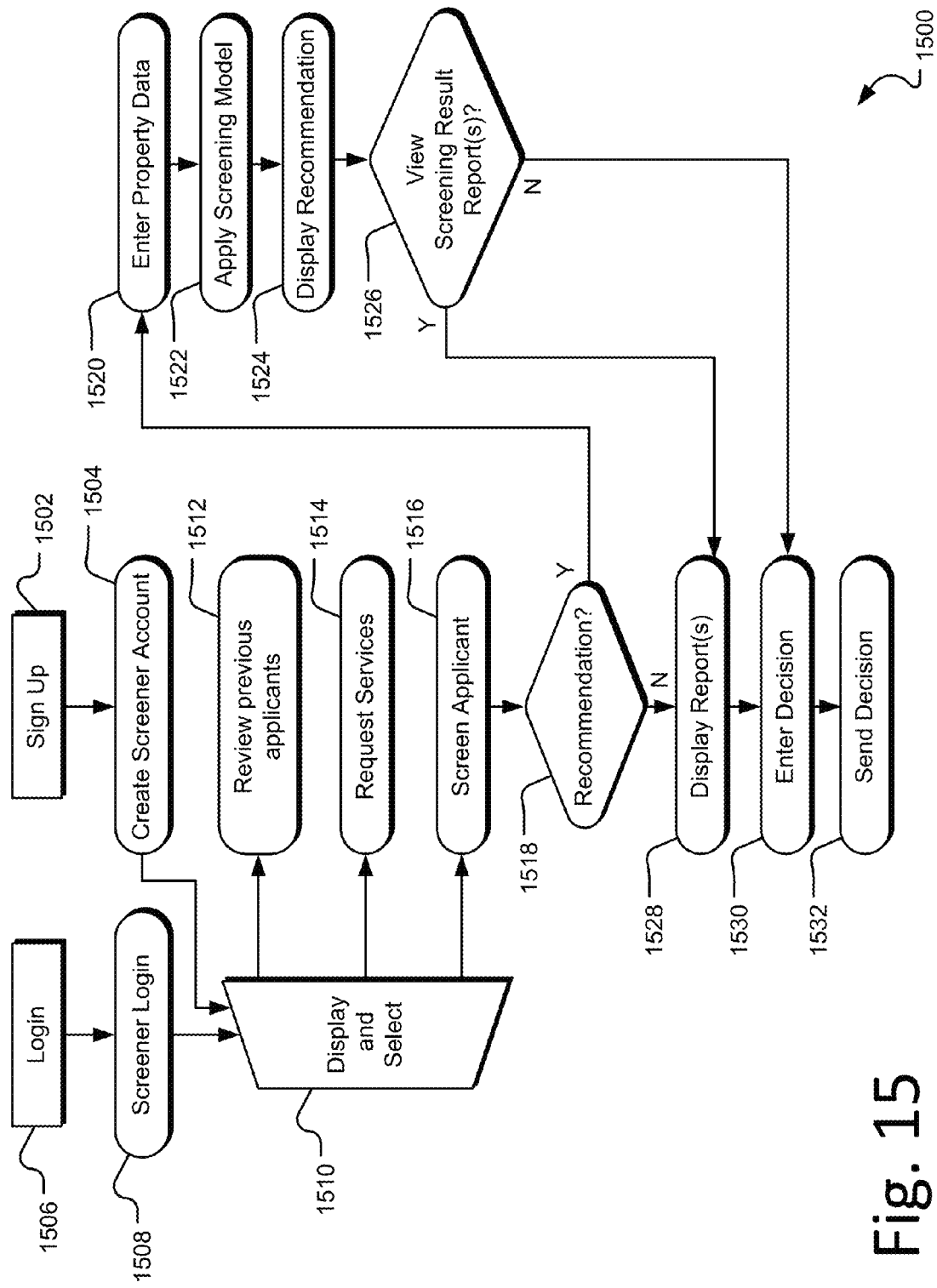
FIG. 15 illustrates exemplary operations for processing a screener's use of an applicant screening system.
Figure 16:
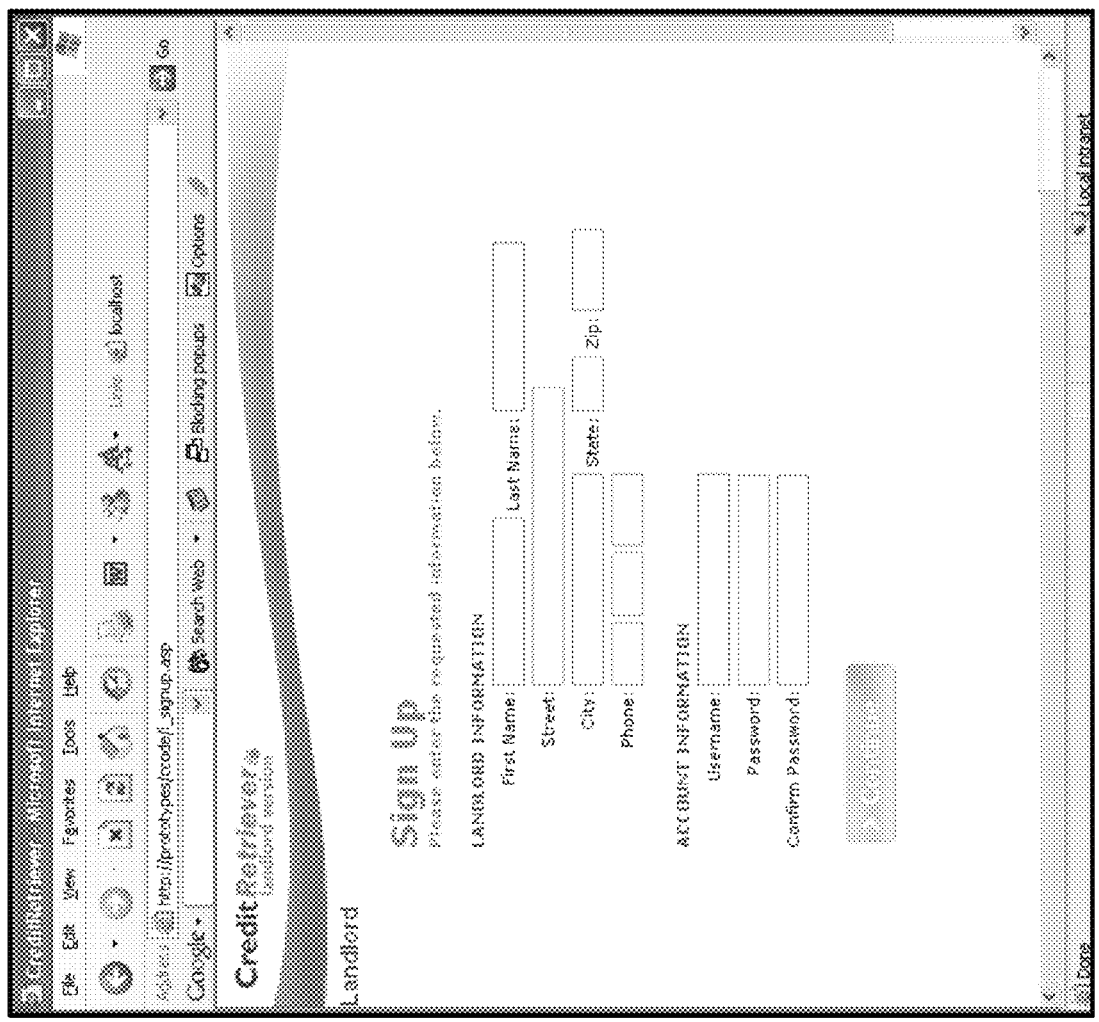
FIG. 16 illustrates a screenshot for creating a screener's account in an exemplary applicant screening system.
Figure 17:
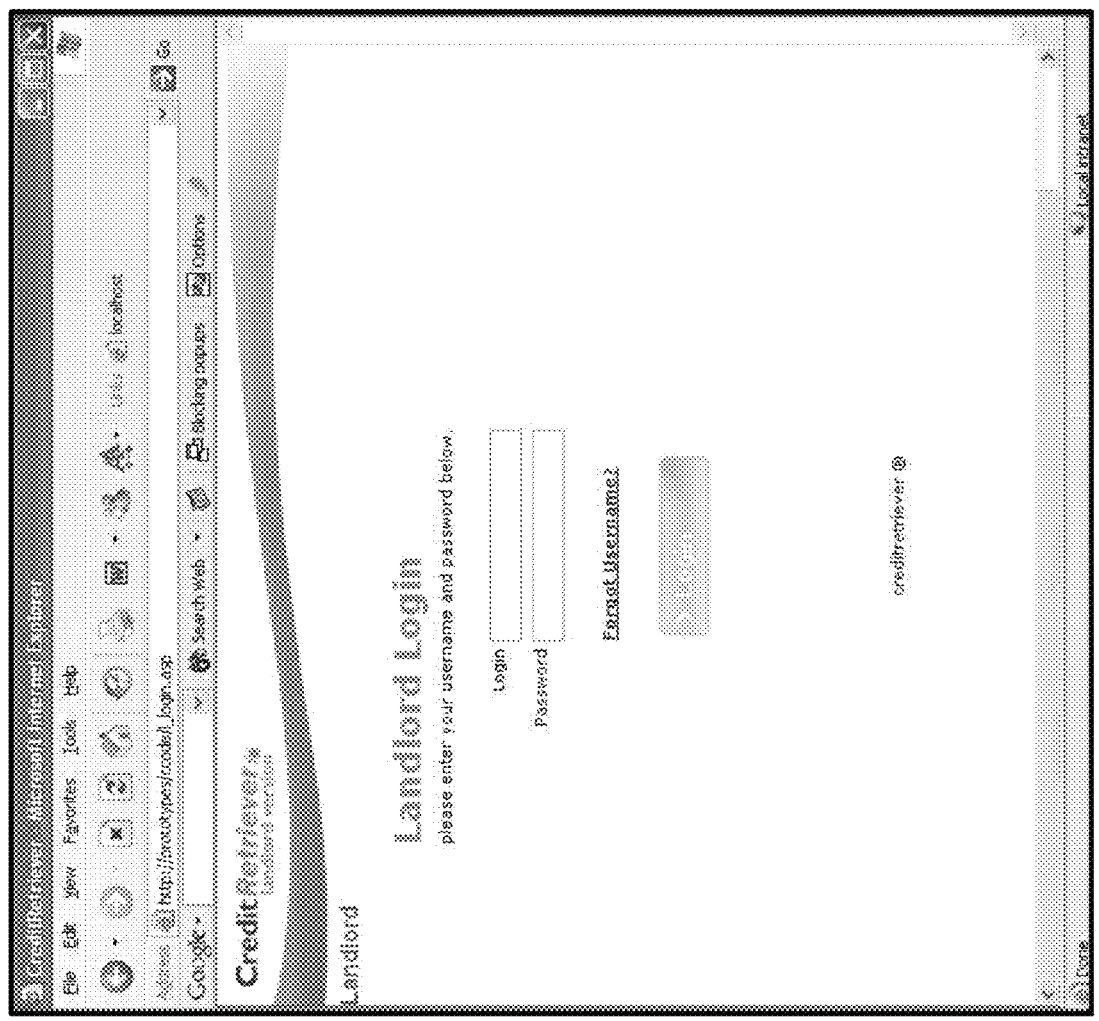
FIG. 17 illustrates a screenshot allowing a screener to log into an exemplary applicant screening system.

FIG. 15 illustrates exemplary operations 1500 for processing a screener's use of an applicant screening system. If the screener selects the Sign Up option 1502 at the Welcome screen, the screener can create a new account in an account creation operation 1504. The screener can enter relevant identification, login, and password information, and any other information (collectively, "screener account information"). An exemplary Create Landlord Account screen 1600 is illustrated in FIG. 16. If the screener selects the Login operation 1506 at the Welcome screen, a login operation 1508 authenticates the screener as a valid user of the system. See Login screenshot 1700 in FIG. 17.

Figure 18:
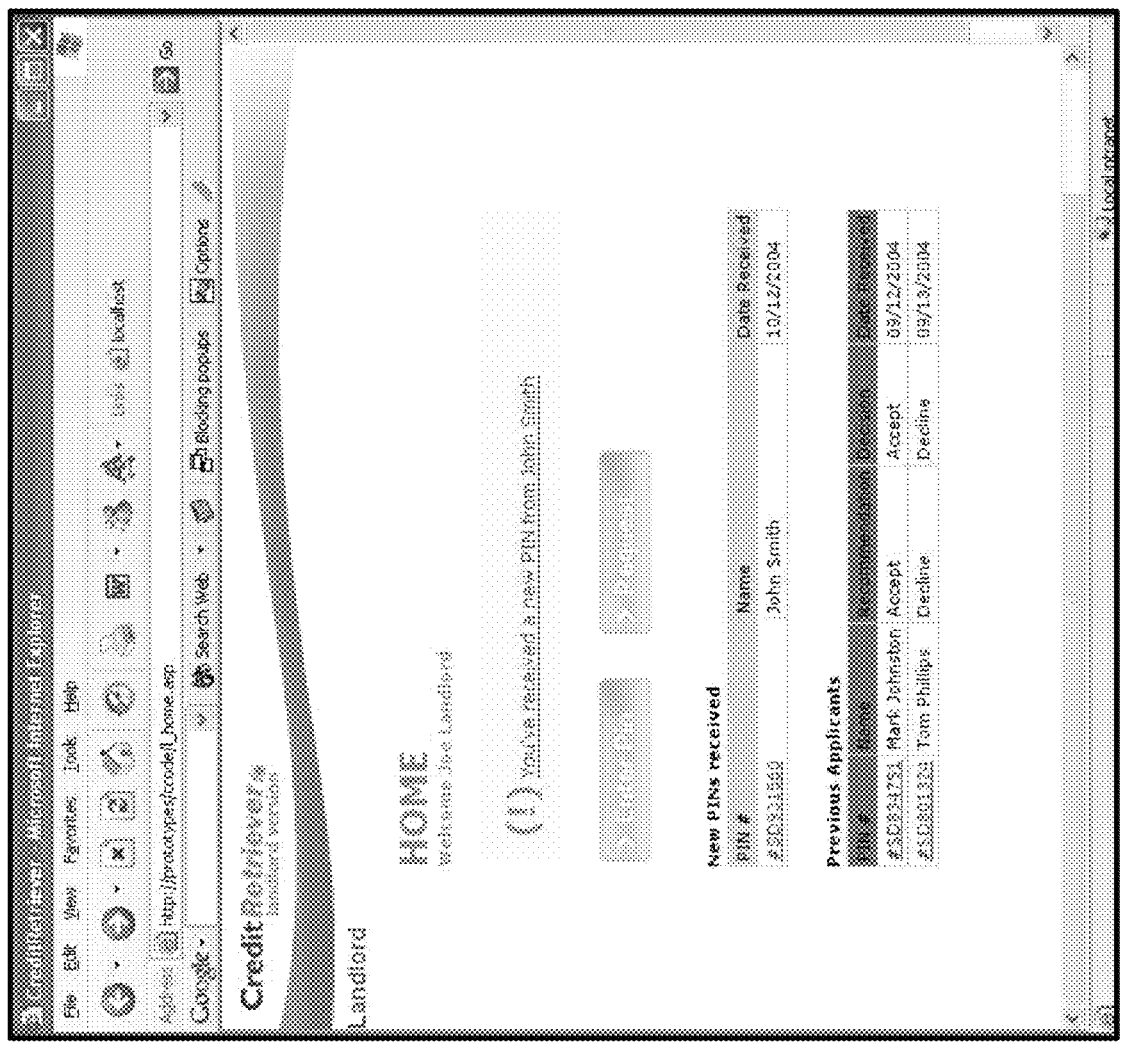
FIG. 18 illustrates a screenshot allowing a screener to view screening information in an exemplary applicant screening system.

After a screener is logged into the system, he or she is presented with various options and records of current and historical actions in Display and Selection operation 1510. See Home screenshot 1800 in FIG. 18. Newly received screening results (e.g., which have not yet been reviewed and/or acted upon by the screener) may be accessed through the "New PINS received" section. Previously viewed results may be accessed through the "Previous Applicants" section, which also shows the decisions made by the screener for each applicant. An "Enter Pin" option allows a screener to manually enter a personal identification code provided by an applicant. A Request option allows a screener to request a personal identification code and, thus, screening results from an individual applicant.

Figure 23:
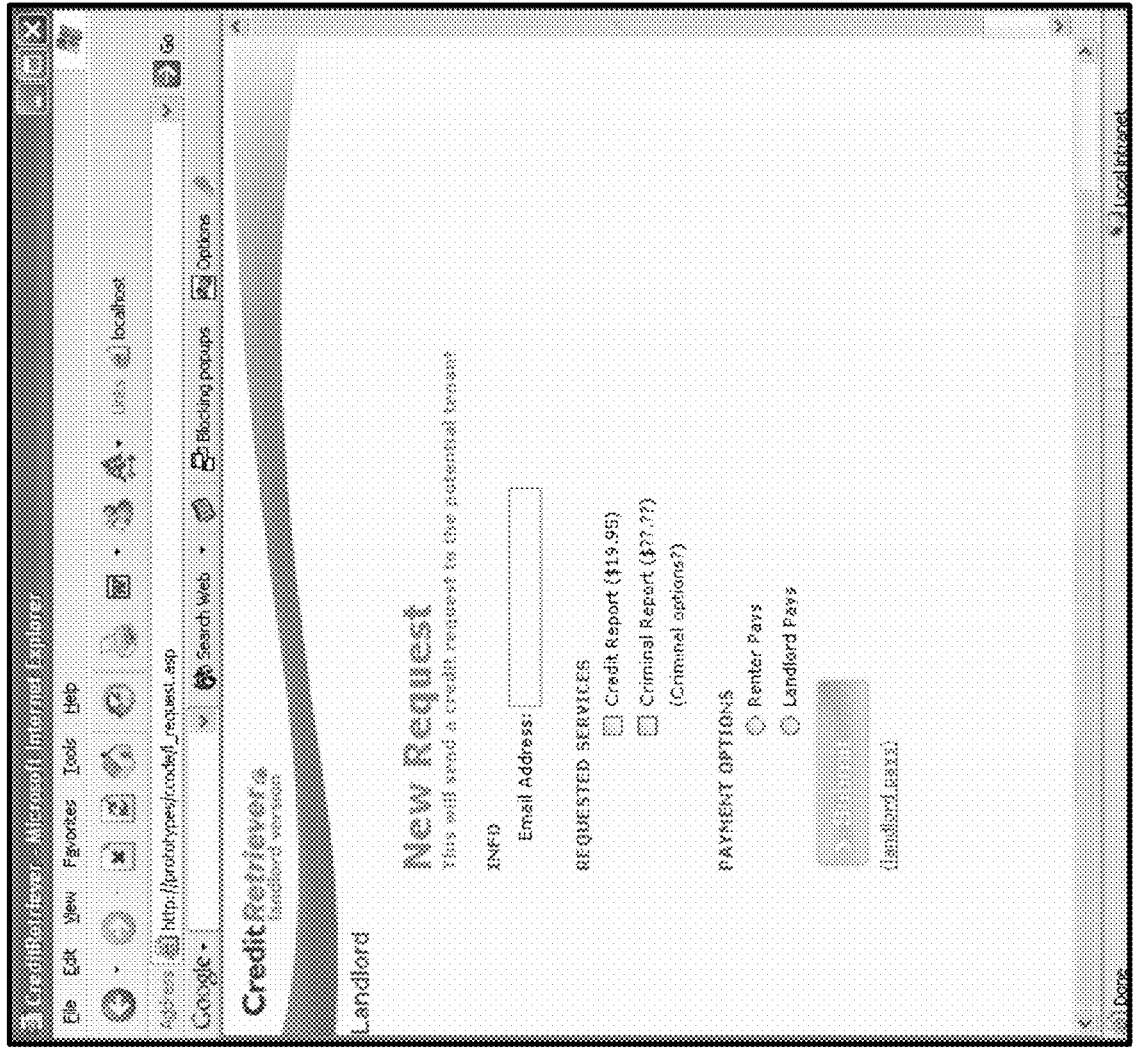
FIG. 23 illustrates a screenshot allowing a screener to send screening information to an applicant in an exemplary applicant screening system.
Figure 24:
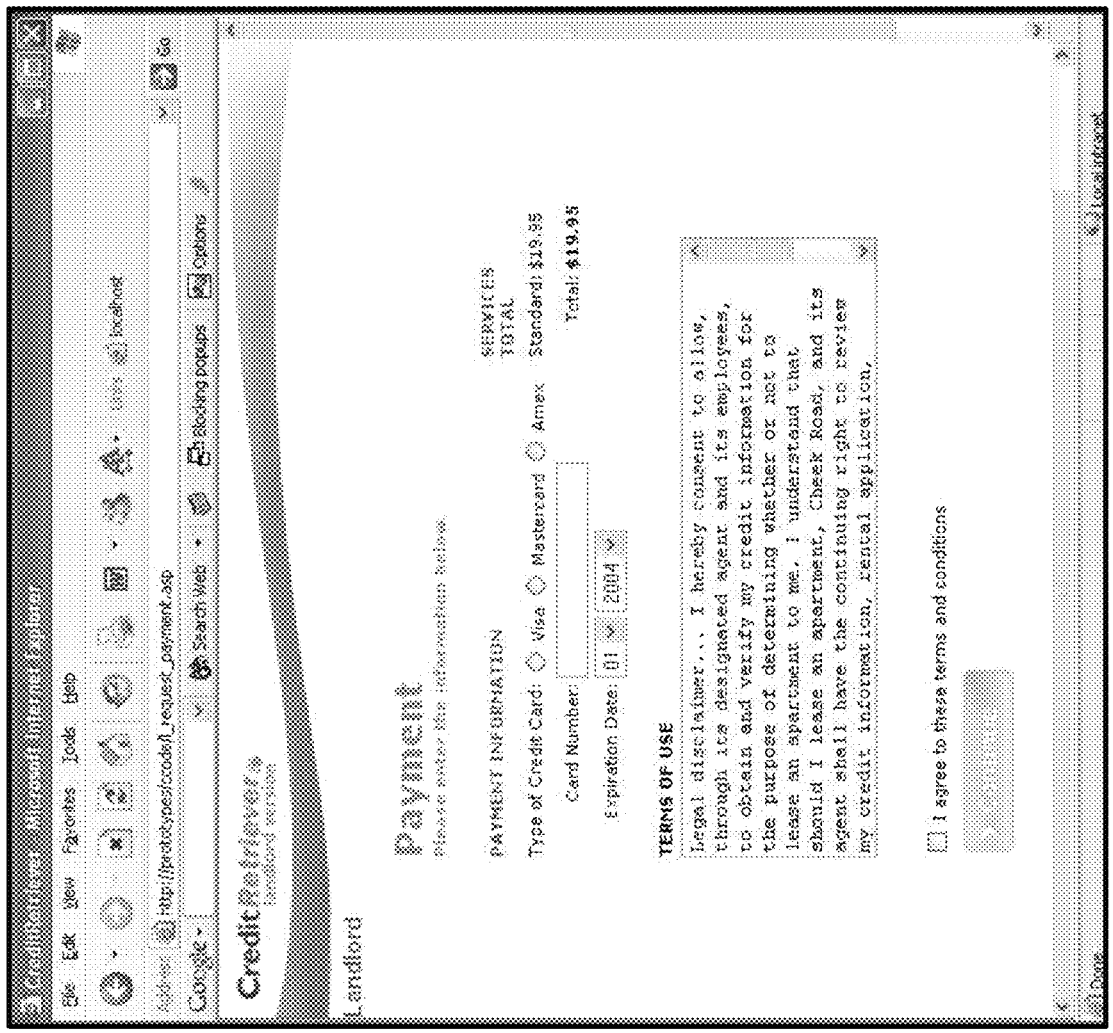
FIG. 24 illustrates a screenshot allowing a screener to pay for applicant screening-related services in an exemplary applicant screening system.
Figure 25:
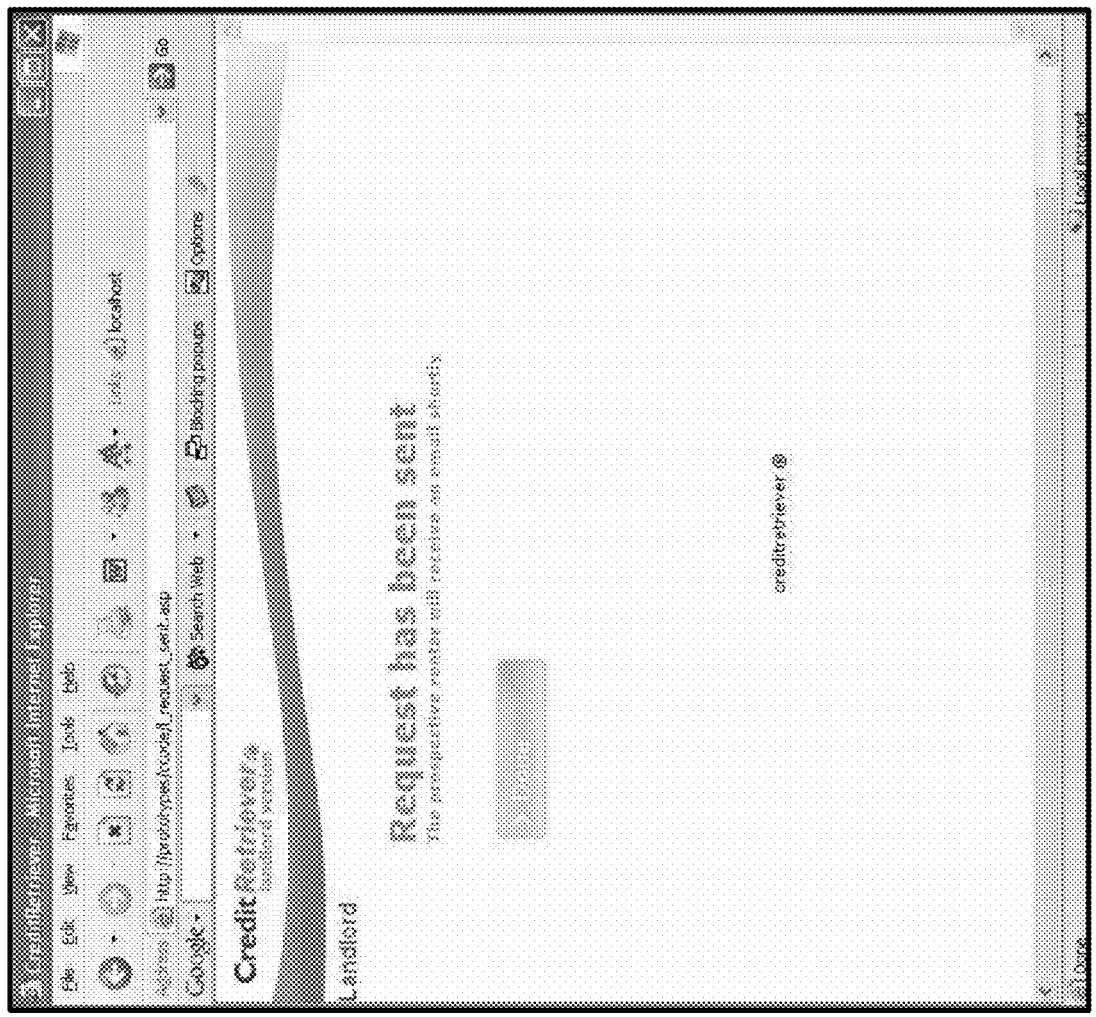
FIG. 25 illustrates a screenshot indicating communication by a screener to the applicant of a screening request in an exemplary applicant screening system.

If the screener elects to request screening results for a potential applicant, a Request Services operation 1514 will present the screener with a New Request screen (see New Request screenshot 23 of FIG. 23), where the screener can specify the email address of the potential applicant. The screener also identifies the screening reports he or she requires for an application and indicates whether the renter or the landlord will pay for the screening services. A Payment screenshot 2400 is shown in FIG. 24 to process landlord payments. A Request Confirmation screenshot 2500 is shown in FIG. 25, indicating that the screener's request was sent to the applicant associated with the provided email address.

Figure 21:
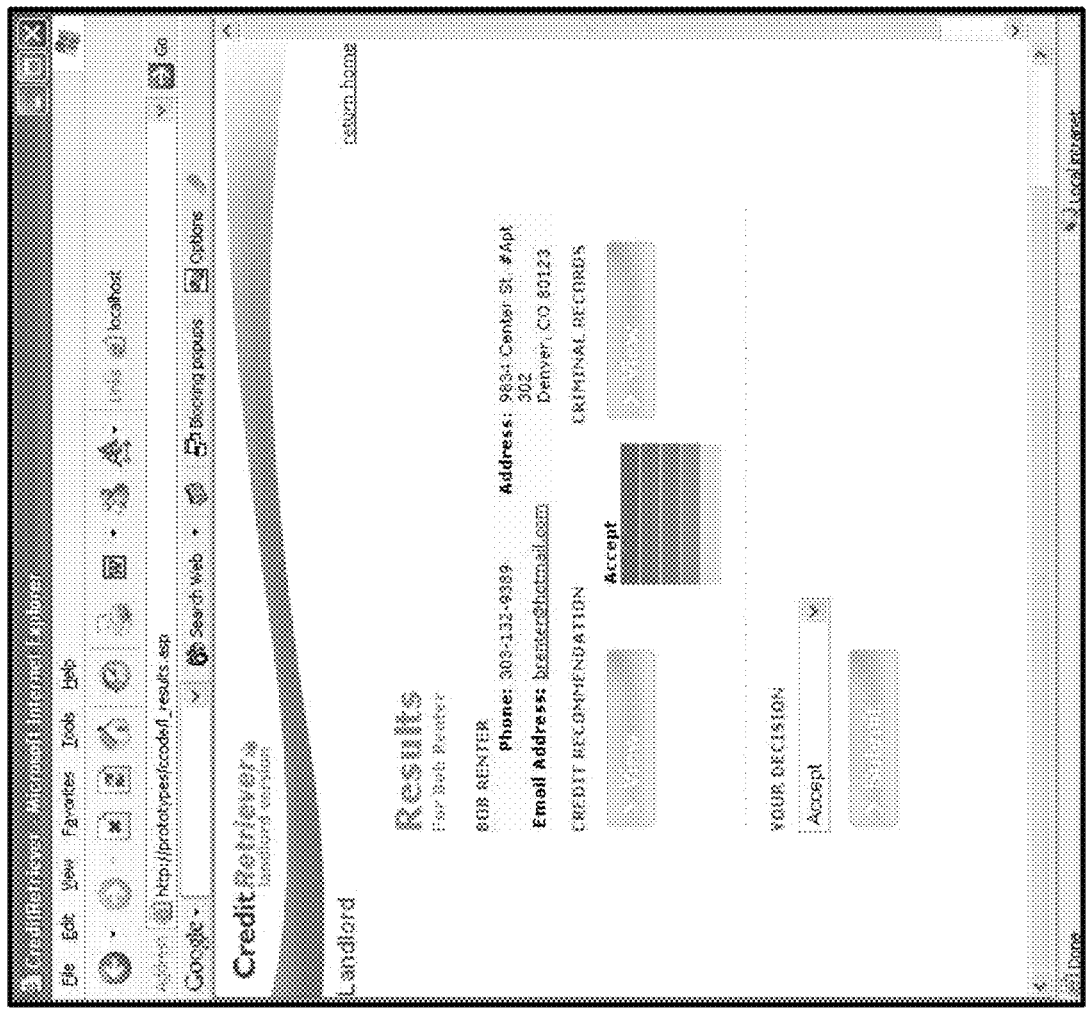
FIG. 21 illustrates a "Results" screenshot for a screener in an exemplary applicant screening system.

If the screener elects to view results/decisions of previous applicants (e.g., by selecting the hyperlink associated with the applicant's PIN), a screening results page is displayed in review operation 1512 (see, for example, Results screenshot 2100 in FIG. 21, although the decision is fixed when reviewing results for previous applicants).

Figure 19:
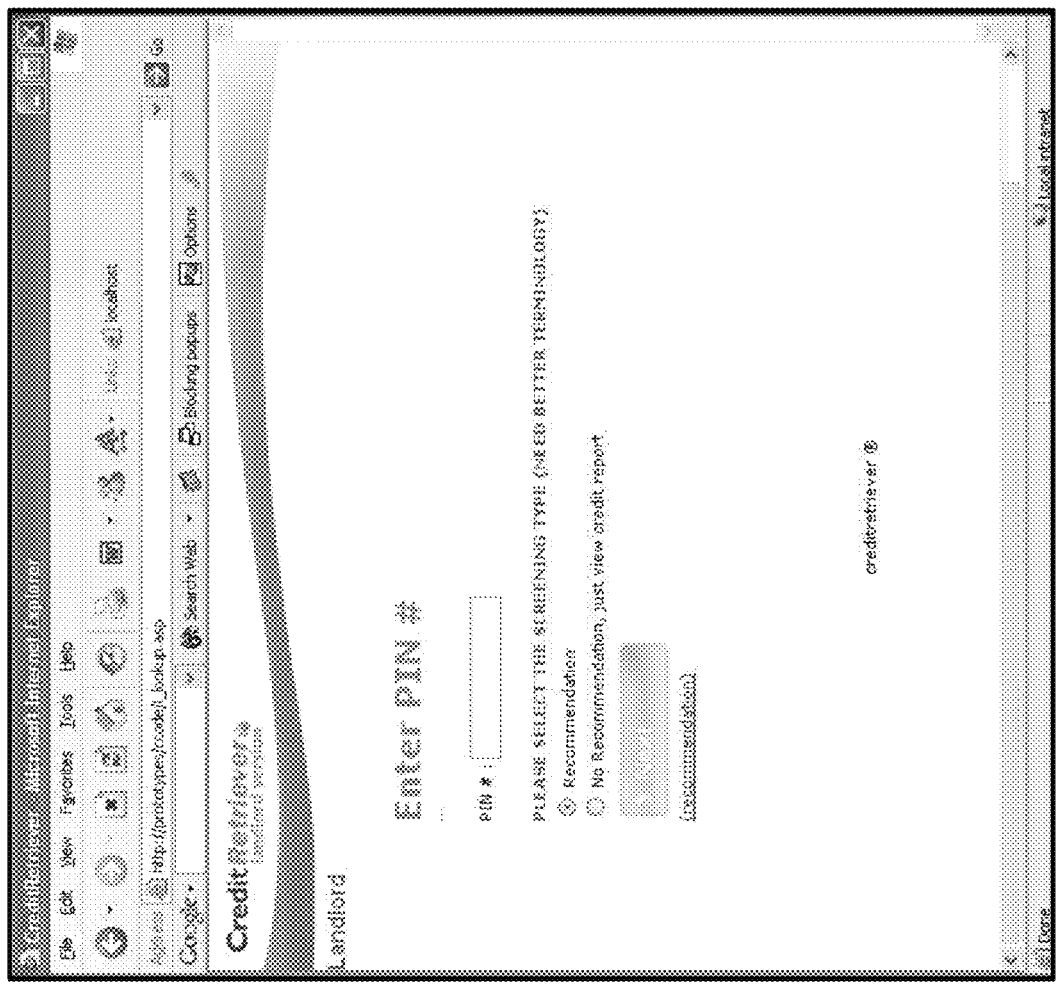
FIG. 19 illustrates a screenshot allowing a screener to view screening information using a manually entered personal identification code of an applicant in an exemplary applicant screening system.

If the screener elects to view a newly received PIN, which may have been submitted by an applicant on the applicant's own accord or in response to a request by the landlord, the Screen Applicant operation 1516 processes the screener's selection. If the selection was based on a manually entered PIN, the screener can enter the PIN through a screen such as that shown in Enter PIN # screenshot 1900 of FIG. 19. In the manual-PIN-entry portion of the Screen Applicant operation 1516, the screener can select whether he or she wants the screening service to provide a recommendation based on the screening results.

Figure 20:
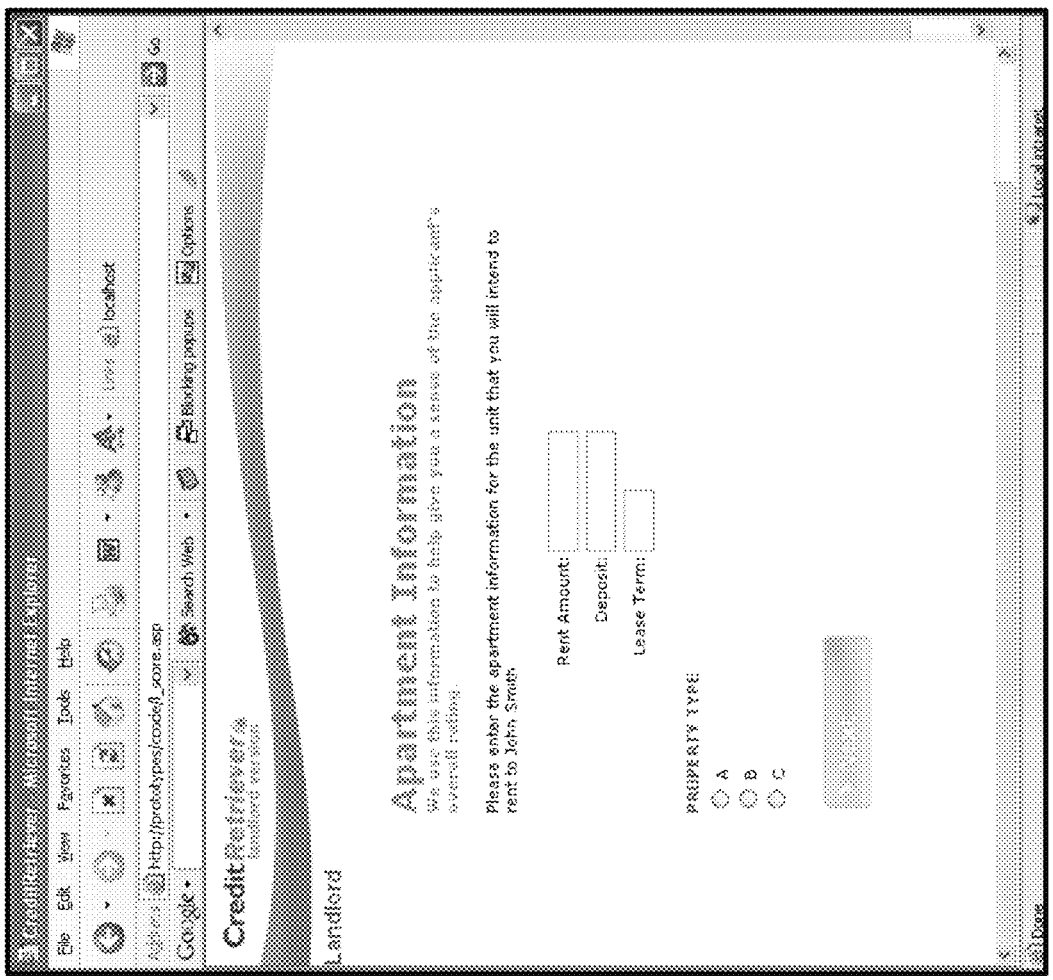
FIG. 20 illustrates a screenshot allowing a screener to enter property-specific data in an exemplary applicant screening system.

If a recommendation is requested, as determined by a decision operation 1518, the screener provides information about that which is applied for, such as an apartment, in a data entry operation 1520. (See the Apartment Information screenshot 2000 in FIG. 20.) In an alternative example, the applicant may be applying for a loan, so the screener may enter information about the desired loan or the system may be preconfigured with appropriate loan information. Other scenarios may involve job descriptions, university entrance requirements, etc.

A modeling operation 1522 applies the screening model to the property data and the applicant's screening results. In one implementation, the property data is sent to a screening server, which applies a server-based screening model to the property data and the screening results. In another implementation, the screening model is resident on the screener's computer system, where the model is applied to the data. In addition, this application could occur elsewhere, including at third-party servers. The modeling operation 1522 generates a recommendation, which is displayed to the screener in display operation 1524. See Results screenshot 2100 in FIG. 21.

Figure 22:
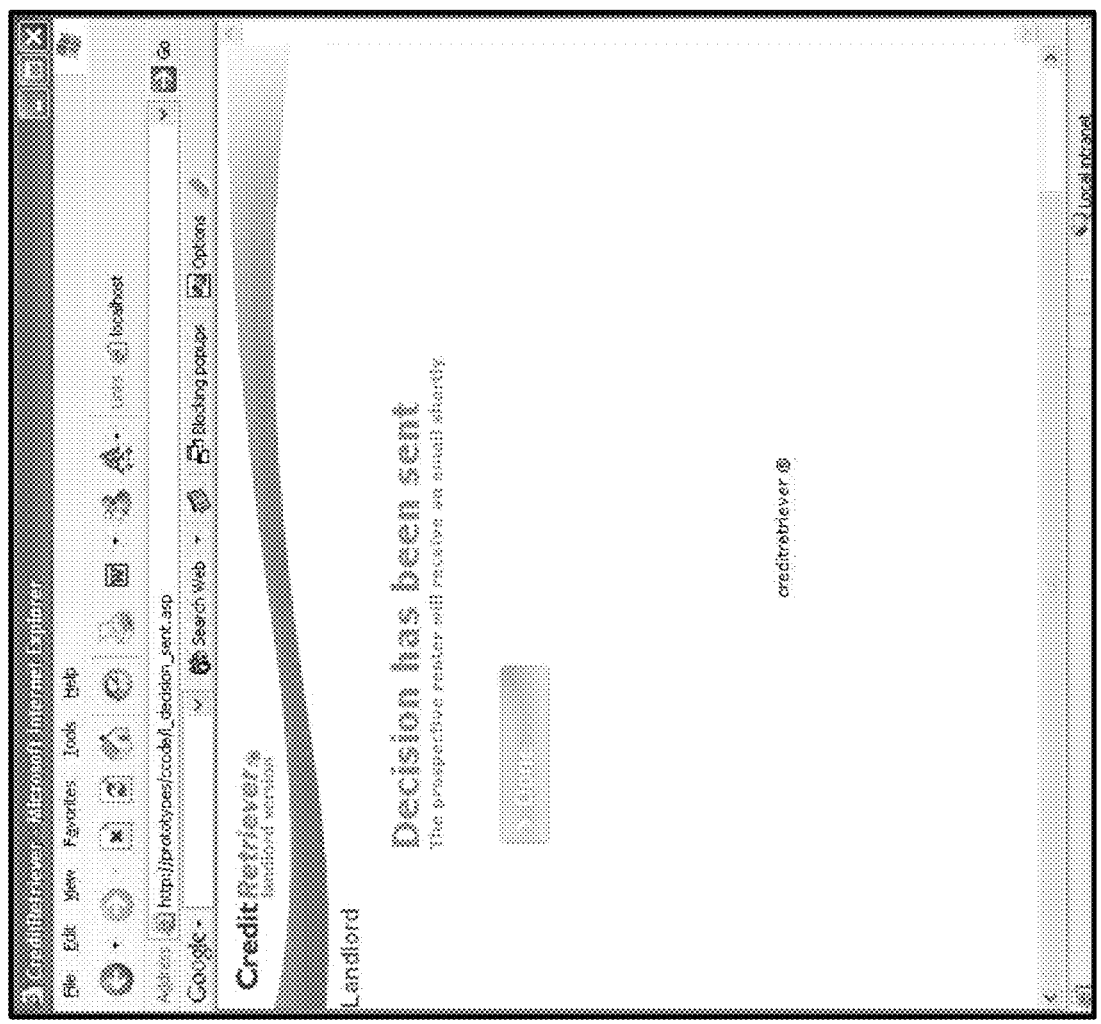
FIG. 22 illustrates a screenshot indicating communication by a screener to the applicant of an application decision in an exemplary applicant screening system.

The screener may select whether to view the screening result reports in decision operation 1526. Report viewing is performed in display operation 1528. Otherwise, or after report viewing, the screener enters a decision in decision operation 1530, and the decision is sent to the applicant in transmission operation 1532 (e.g., by email). See the confirmation screenshot 2200 in FIG. 22.

Figure 26:
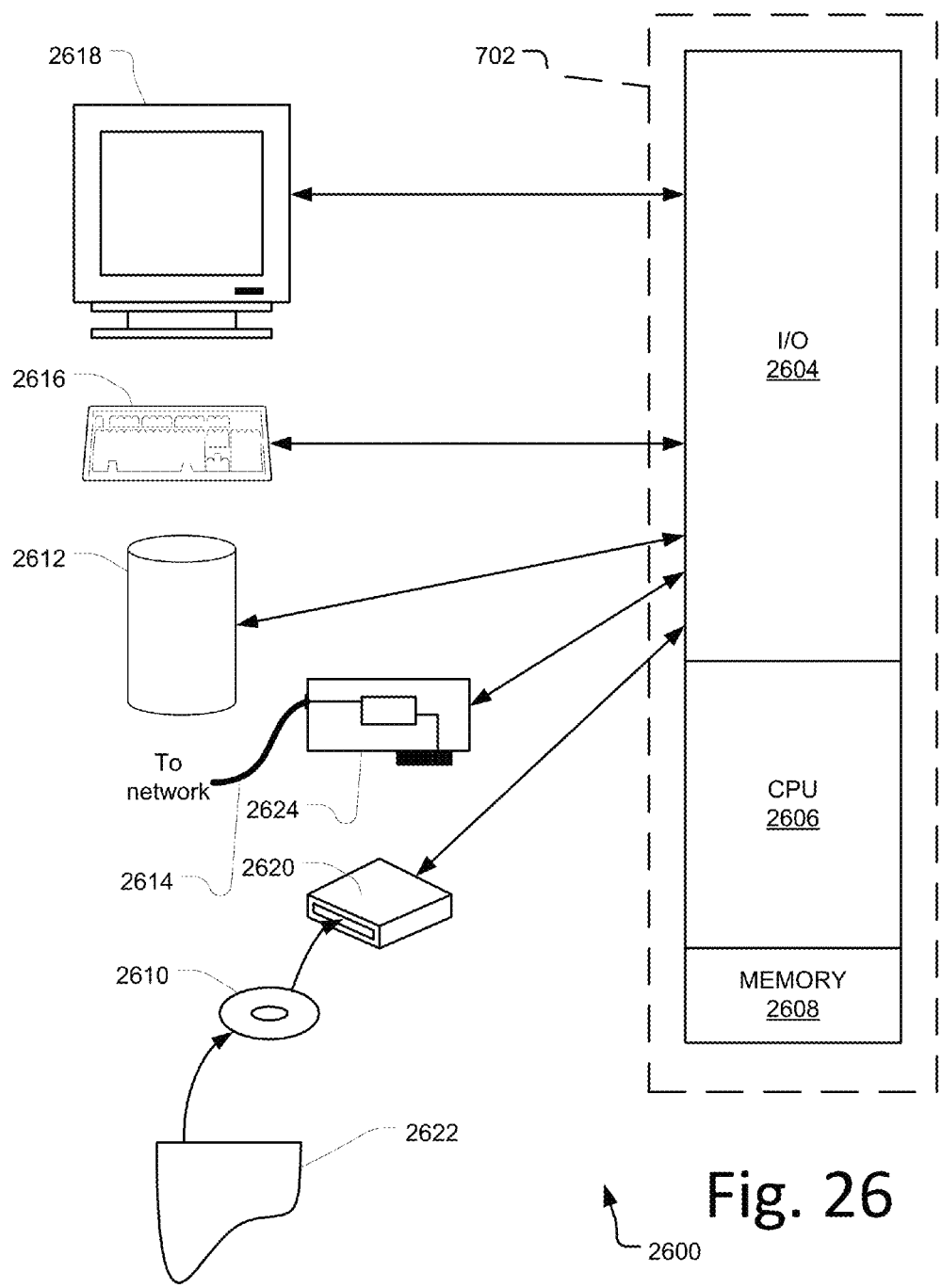
FIG. 26 illustrates an exemplary system useful in implementations of the described technology.

FIG. 26 illustrates an exemplary system useful in implementations of the described technology. A general purpose computer system 2600 is capable of executing a computer program product to execute a computer process. Data and program files may be input to the computer system 2600, which reads the files and executes the programs therein. Some of the elements of a general purpose computer system 2600 are shown in FIG. 26 wherein a processor 2602 is shown having an input/output (I/O) section 2604, a Central Processing Unit (CPU) 2606, and a memory section 2608. There may be one or more processors 2602, such that the processor 2602 of the computer system 2600 comprises a single central-processing unit 2606, or a plurality of processing units, commonly referred to as a parallel processing environment. The computer system 2600 may be a conventional computer, a distributed computer, or any other type of computer. The described technology is optionally implemented in software devices loaded in memory 2608, stored on a configured DVD/CD-ROM 2610 or storage unit 2612, and/or communicated via a wired or wireless network link 2614 on a carrier signal, thereby transforming the computer system 2600 in FIG. 26 to a special purpose machine for implementing the described operations.

The I/O section 2604 is connected to one or more user-interface devices (e.g., a keyboard 2616 and a display unit 2618), a disk storage unit 2612, and a disk drive unit 2620. Generally, in contemporary systems, the disk drive unit 2620 is a DVD/CD-ROM drive unit capable of reading the DVD/CD-ROM medium 2610, which typically contains programs and data 2622. Computer program products containing mechanisms to effectuate the systems and methods in accordance with the described technology may reside in the memory section 2604, on a disk storage unit 2612, or on the DVD/CD-ROM medium 2610 of such a system 2600. Alternatively, a disk drive unit 2620 may be replaced or supplemented by a floppy drive unit, a tape drive unit, or other storage medium drive unit. The network adapter 2624 is capable of connecting the computer system to a network via the network link 2614, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 2600 is connected (by wired connection or wirelessly) to a local network through the network interface or adapter 2624, which is one type of communications device. When used in a WAN-networking environment, the computer system 2600 typically includes a modem, a network adapter, or any other type of communications device for establishing communications over the wide area network. In a networked environment, program modules depicted relative to the computer system 2600 or portions thereof, may be stored in a remote memory storage device. It is appreciated that the network connections shown are exemplary and other means of and communications devices for establishing a communications link between the computers may be used.

In an exemplary implementation, screening kiosk software modules, screener client software modules, screening server software modules, and other modules may be incorporated as part of the operating system, application programs, or other program modules. Screening results, personal identification codes, account information, property information, decision data, and other data may be stored as program data.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The applicant screening systems and services described herein are used to provide screening results about an applicant or consumer to a property manager at a remote location, which inherently requires personal information about the applicant or consumer to be communicated via a communications link, such as an internet connection. This required applicant/consumer information is of a confidential, personal, and/or financial nature, thus security of the communications link transmitting this personal information is of paramount importance. It would certainly be desirable to increase security of the communication or transmission of this confidential or personal information to protect the privacy of the applicant or consumer. Security and protection of private, and especially financial data, is of paramount importance when transmitting data via unsecured communications links, such as the internet.

Thus, providing an additional layer of security or adding security features to the screening systems and services described herein will be very advantageous. Thus, it would be advantageous to have applicant screening systems and services having enhanced security features to protect the privacy and personal information of applicants or consumers entering their personal information, which will be transmitted via a communications link.

Figure 27:
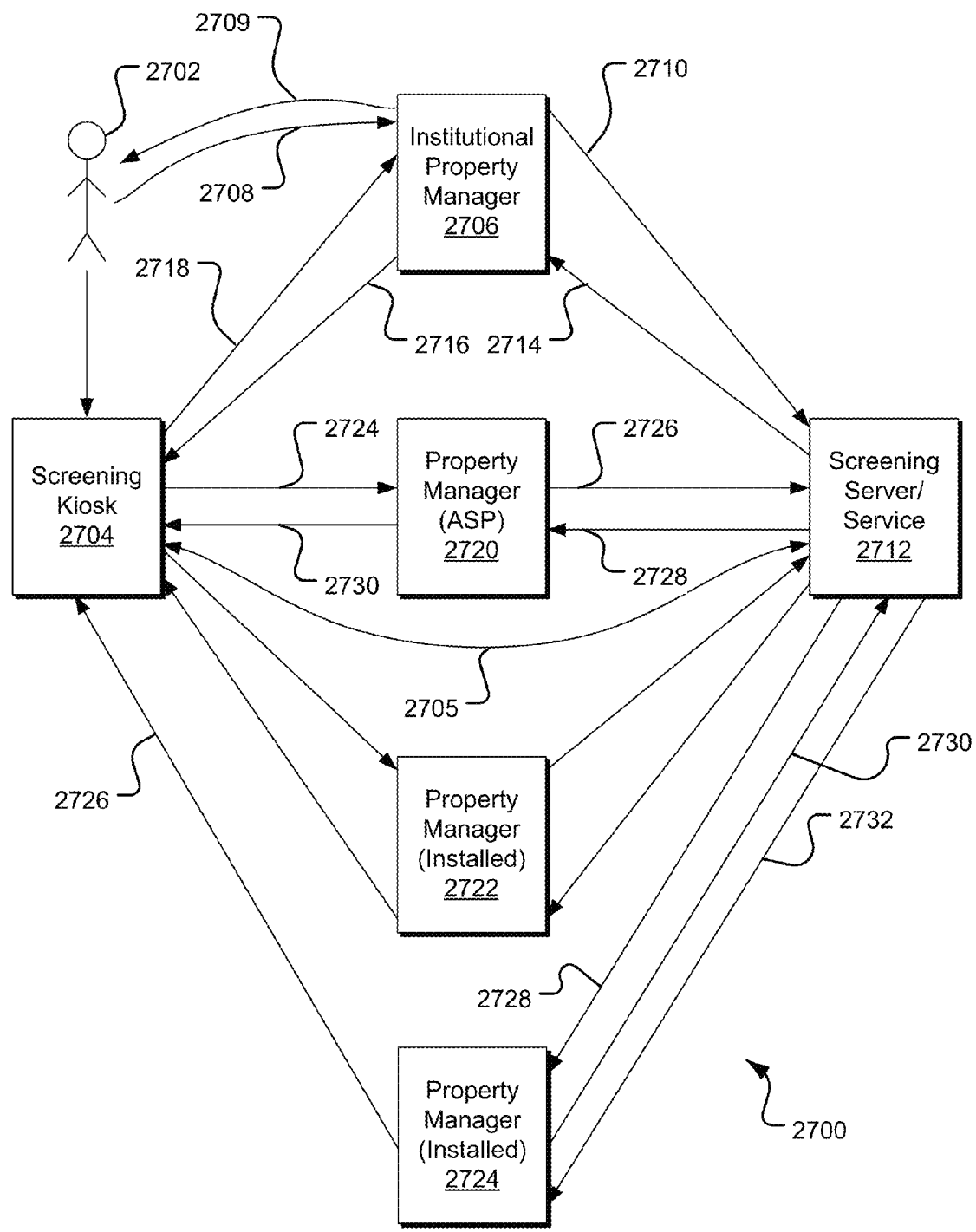
FIG. 27 illustrates an exemplary system for screening applicants.

Additional implementations of screening systems and services are also disclosed herein. In one implementation, a screening operation is performed as illustrated in FIG. 27. The screening operation commences with the entry of an applicant profile by an applicant 2702. In one implementation, a property manager 2724 commences the screening operation by requesting screening information or an applicant profile from an applicant 2702. The property manager 2724 may commence the screening operation by sending a request to screening server 2712, which then relays the request to the applicant 2702, requesting screening information or an applicant profile from the applicant 2702.

Figure 28:
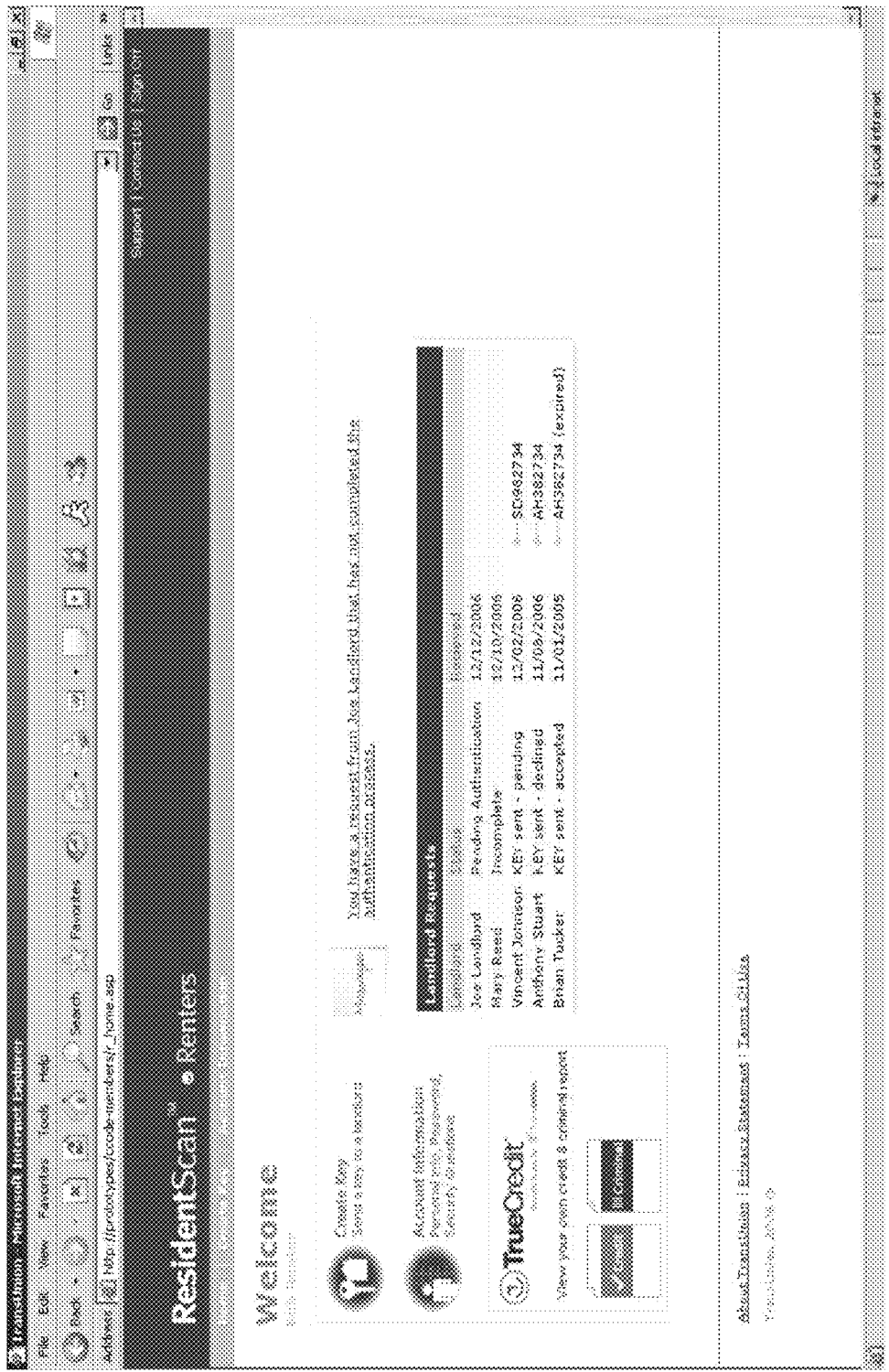
FIG. 28 illustrates a screenshot welcoming an applicant and displaying recent account activity.
Figure 29:
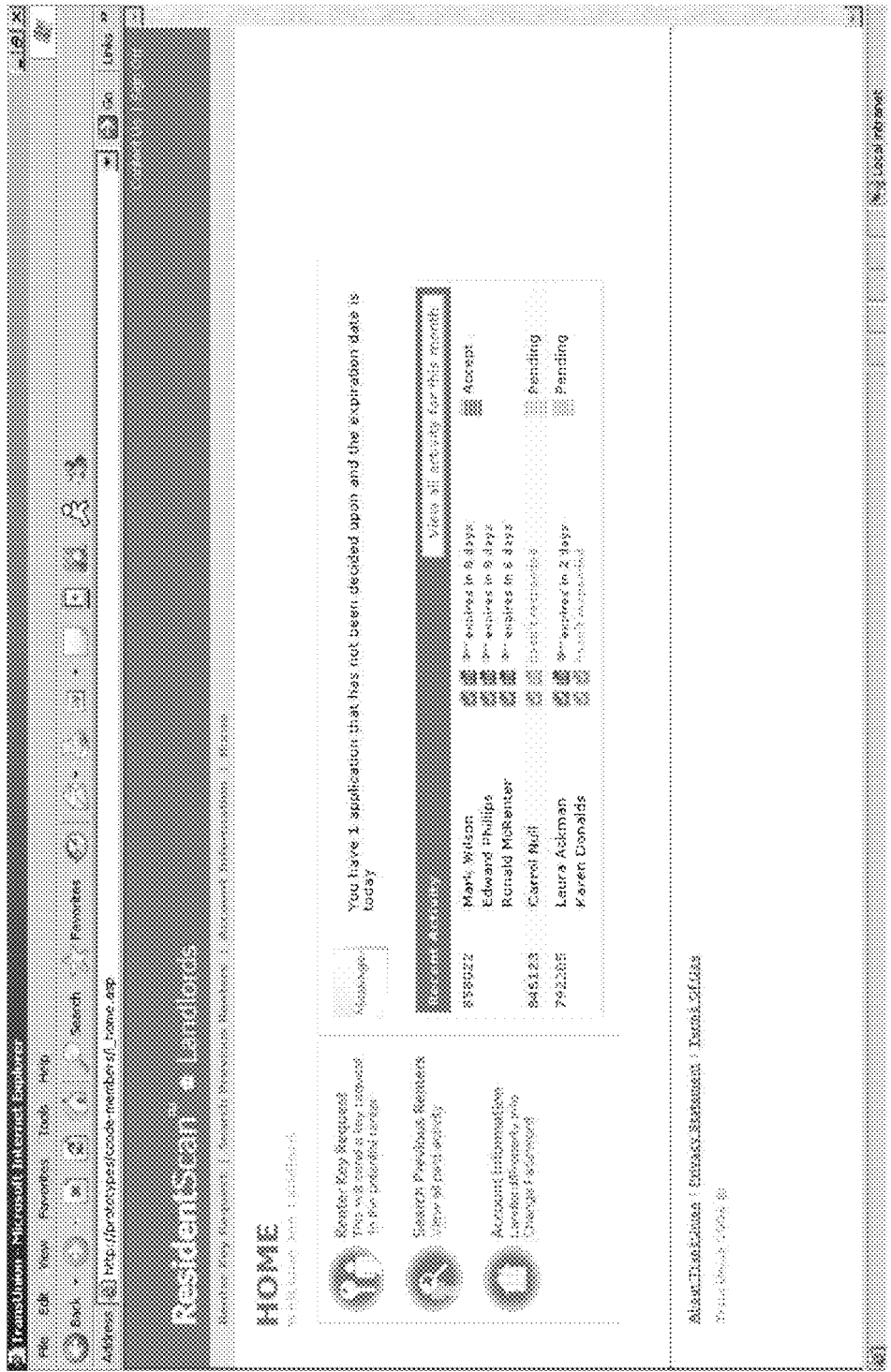
FIG. 29 illustrates a screenshot welcoming a property manager to his/her home page and displaying a summary of recent requests.

FIG. 28 illustrates an example screenshot of an applicant 2702 (or renter) welcome screen and includes options to create a key (to be described in more detail below) or view/update account information, as well as a summary of property manager 2724 (or landlord) requests for information and the status of any submitted requests and dates of submission. FIG. 29 illustrates an example screenshot of a property manager 2724 (or landlord) welcome or home screen and includes options to send an applicant 2702 (or renter) a key request (to be described in more detail below), search previous applicants 2702 (or renters), view/update account information, as well as a summary of recent applicant 2702 (or renter) profile activity status.

The applicant 2702 can commence the screening operation by entering his/her applicant profile via a device, such as a screening kiosk 2704 or client computer, for example. The applicant 2702 may enter his/her profile via a personal computer or computing device connected to a communications network, such as the internet, for example. The applicant 2702 may also enter his/her data or profile via a screening kiosk 2704 which displays screen prompts or screenshots, as previously described above. In some examples, the applicant 2702 may receive a prompt or notification, such as a key request, requesting he/she enter his/her applicant profile. The key request may be initiated and sent by the property manager 2724, as will now be described in more detail.

An applicant 2702 may be prompted to enter his/her profile or information through a key request from a property manager 2724. In this case, system 2700 operates over the internet, such as through a website, and the applicant 2702 receives an email asking them to create an account and a key on the website. Included in the email would be a link that the applicant 2702 would use to direct them to the website to create an account. A portion of the link would have the applicant's 2702 email address embedded in it which would uniquely identify them to the system 2700 initially.

Figure 30:
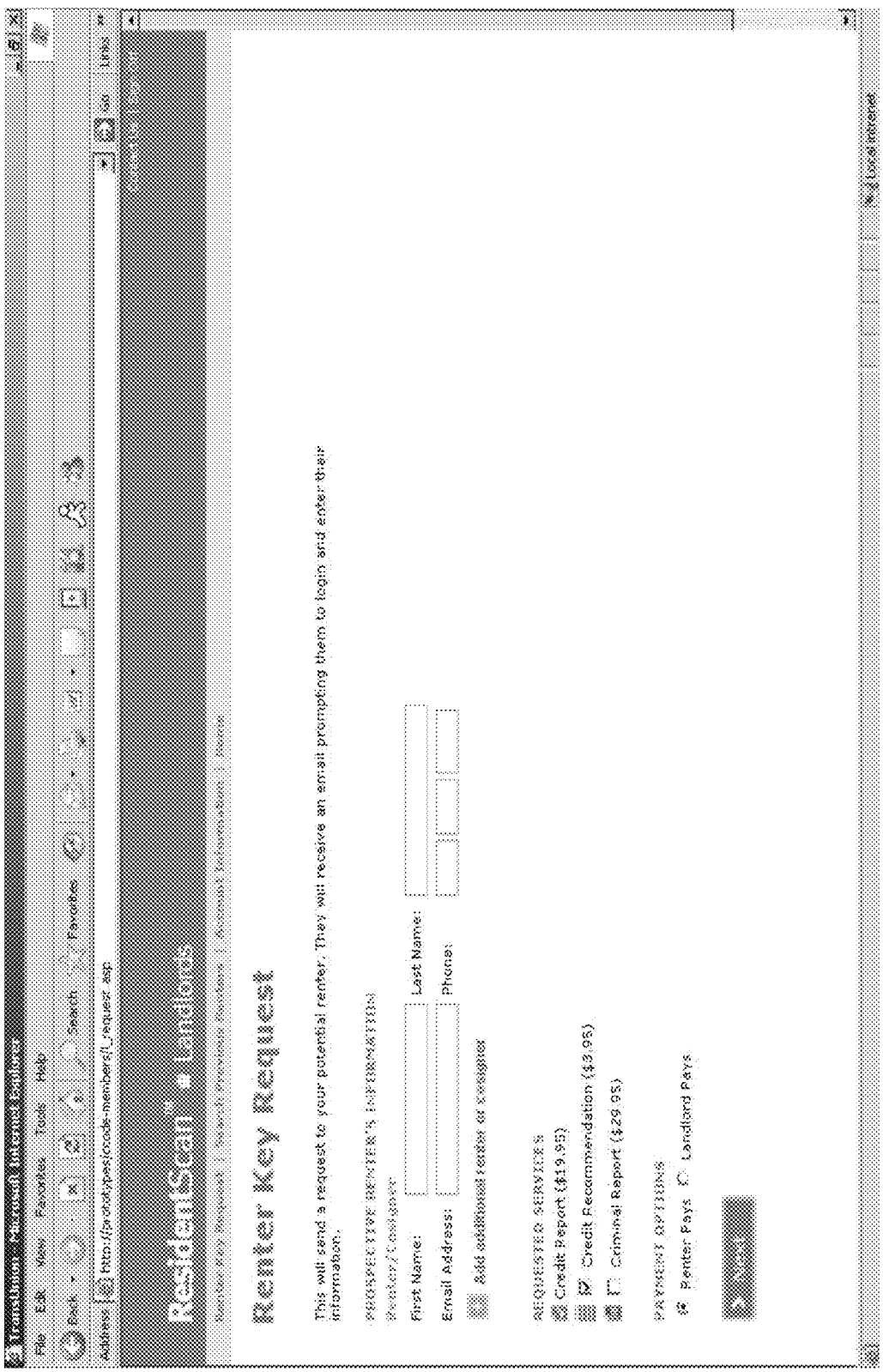
FIG. 30 illustrates a screenshot of options to be selected by a property manager to send a key request to an applicant.
Figure 31:
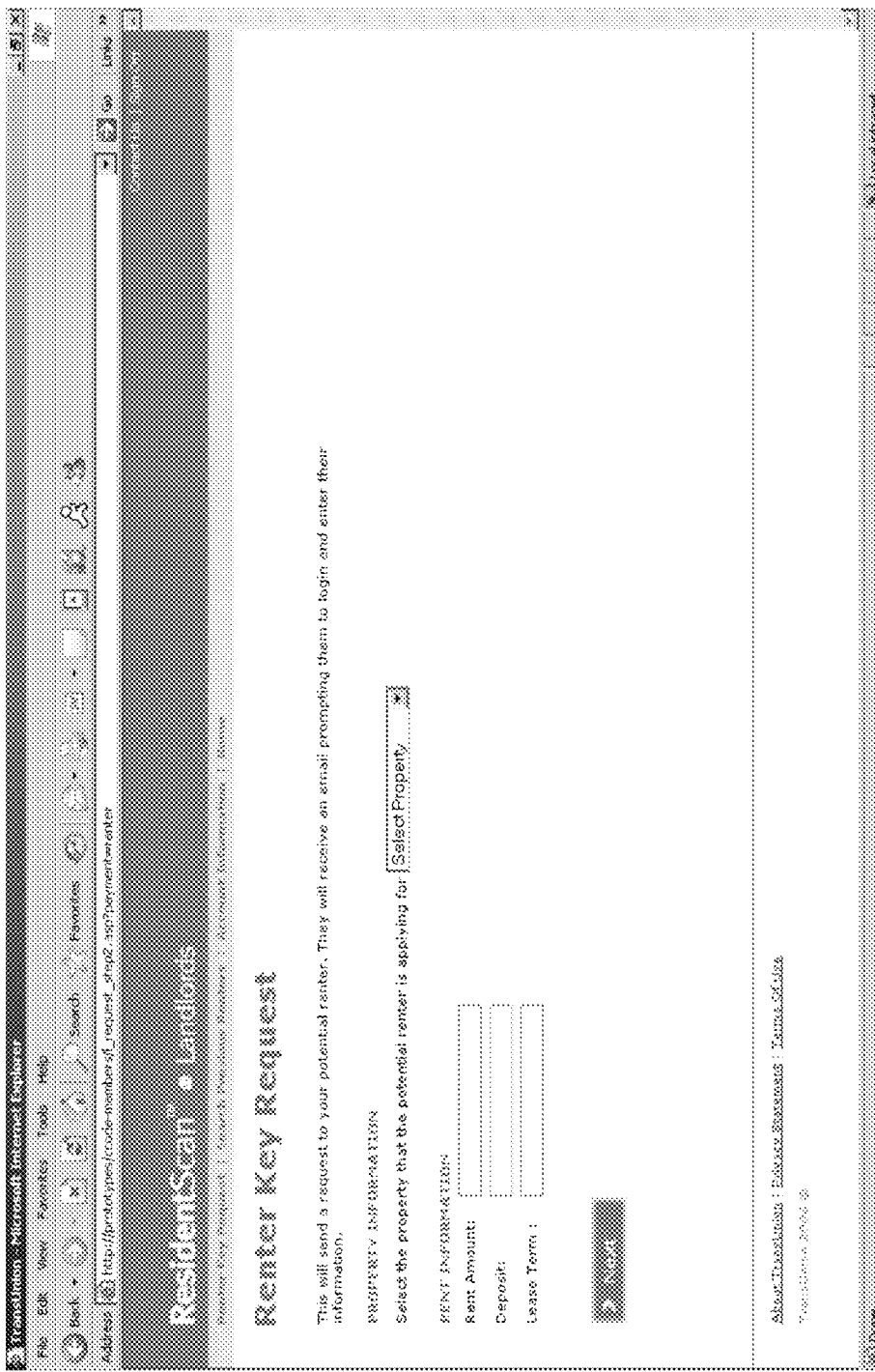
FIG. 31 illustrates a screenshot of options to be selected by a property manager to send a key request to an applicant.

FIGS. 30 and 31 illustrate exemplary screenshots of initialization of key requests to be sent to an applicant 2702 (or renter) from a property manager 2724. Both FIGS. 30 and 31 illustrate screenshots showing parameters to be selected by a property manager 2724 to define what information an applicant 2702 needs to provide. A screenshot prompting a property manager 2724 to specify information about an applicant 2702 is shown in FIG. 30. Also shown in FIG. 30, the property manager 2724 may specify the requested services and may specify payment options for the services (i.e. applicant 2702 pays or property manager 2724 pays). A screenshot prompting a property manager 2724 to specify the specific rental property, rent amount, deposit, and lease term are shown in FIG. 31.

The property manager 2724 can request or specify (represented by arrow 2726) that the applicant 2702 enter his/her profile (i.e. data or information) in one of a number of different types of forms or screening formats (as shown in FIGS. 30 & 31). The type of screening format or form selected will be dependent upon the intended use of the screening results for a particular applicant 2702. For example, if an applicant 2702 is applying to rent an apartment, the data requested/entered will include financial and/or credit history data. In another example, if an applicant 2702 is applying for a job, the data entered will likely include previous job history information and/or professional references. Additionally, an applicant 2702 may be requested to provide other relevant data, such as any previous arrests and/or criminal records. The applicant profile entered via screening kiosk 2704 may be stored on screening server 2712 (represented by arrow 2705). This applicant profile and other screening data or results stored on the screening server 2712 may be encrypted to prevent unauthorized access to personal data, as will be described in more detail below.

Once the applicant profile has been created (i.e. entered via the kiosk 2704 or a computing device) the screening server 2712 then uses the applicant profile to generate screening results and/or recommendations. The recommendations generated by the screening server indicate an acceptable risk level of an applicant 2702 based upon the information in the applicant profile and predetermined risk levels specified by a property manager 2724. The acceptable risk level of the applicant 2702 may comprise a rating or ranking correlating to likelihood that an applicant 2702 would be able to make rental payments on time, etc.

Figure 32:
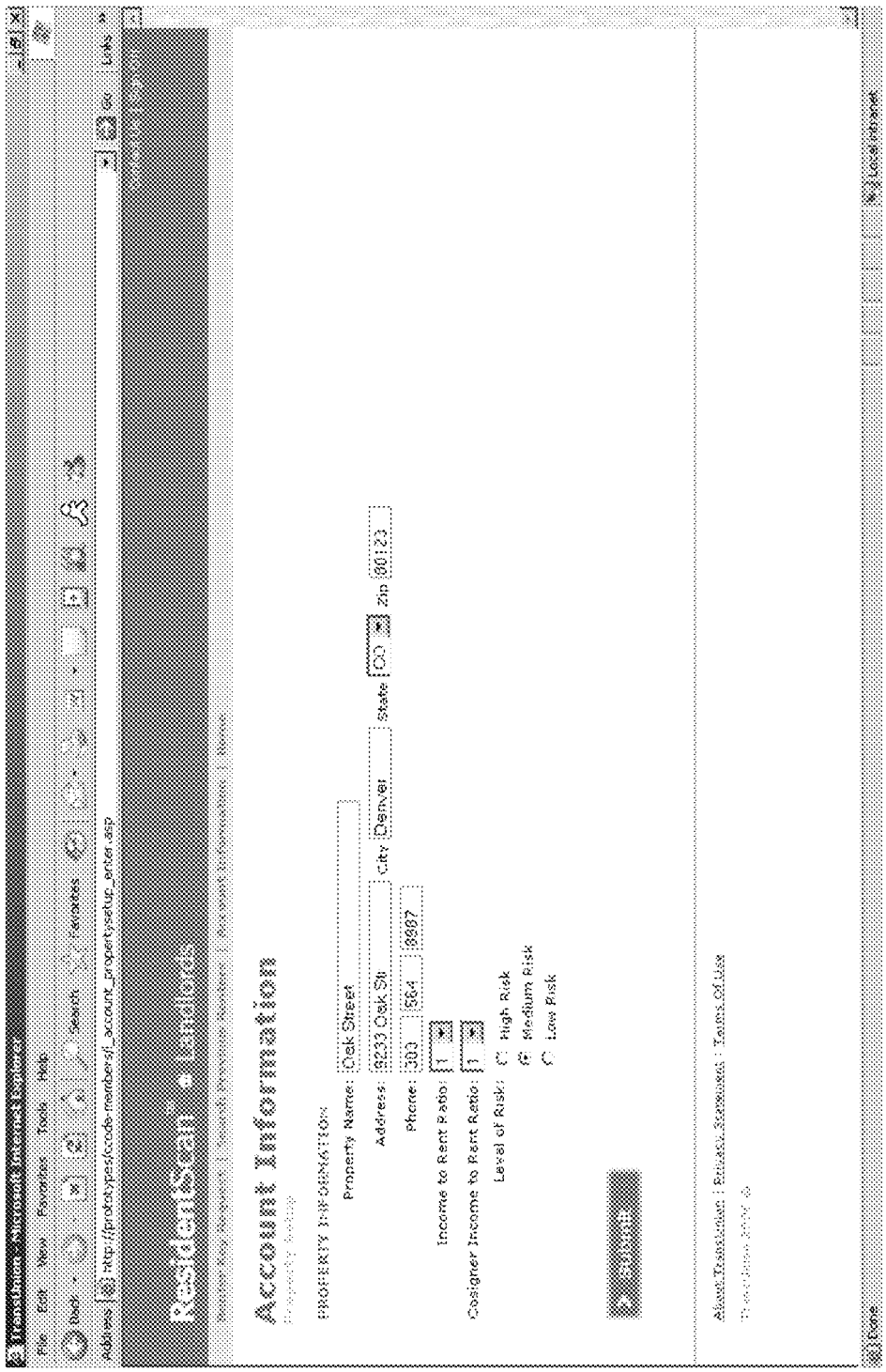
FIG. 32 illustrates a screenshot of parameters to be selected by a property manager to define acceptable levels of risk.

In other examples the acceptable risk level of the applicant 2702 may indicate a number of different factors about the applicant 2702. The screening server 2712 may contain previously entered data, such as charts and/or other information, to correlate a type of applicant profile with a particular type of screening result and/or acceptable risk level of an applicant 2702. The property manager 2724 may specify predetermined risk level values, incorporating information such as income to rent ratios, and correlating those values with acceptable or unacceptable risk levels, as shown in FIG. 32.

Figure 33:
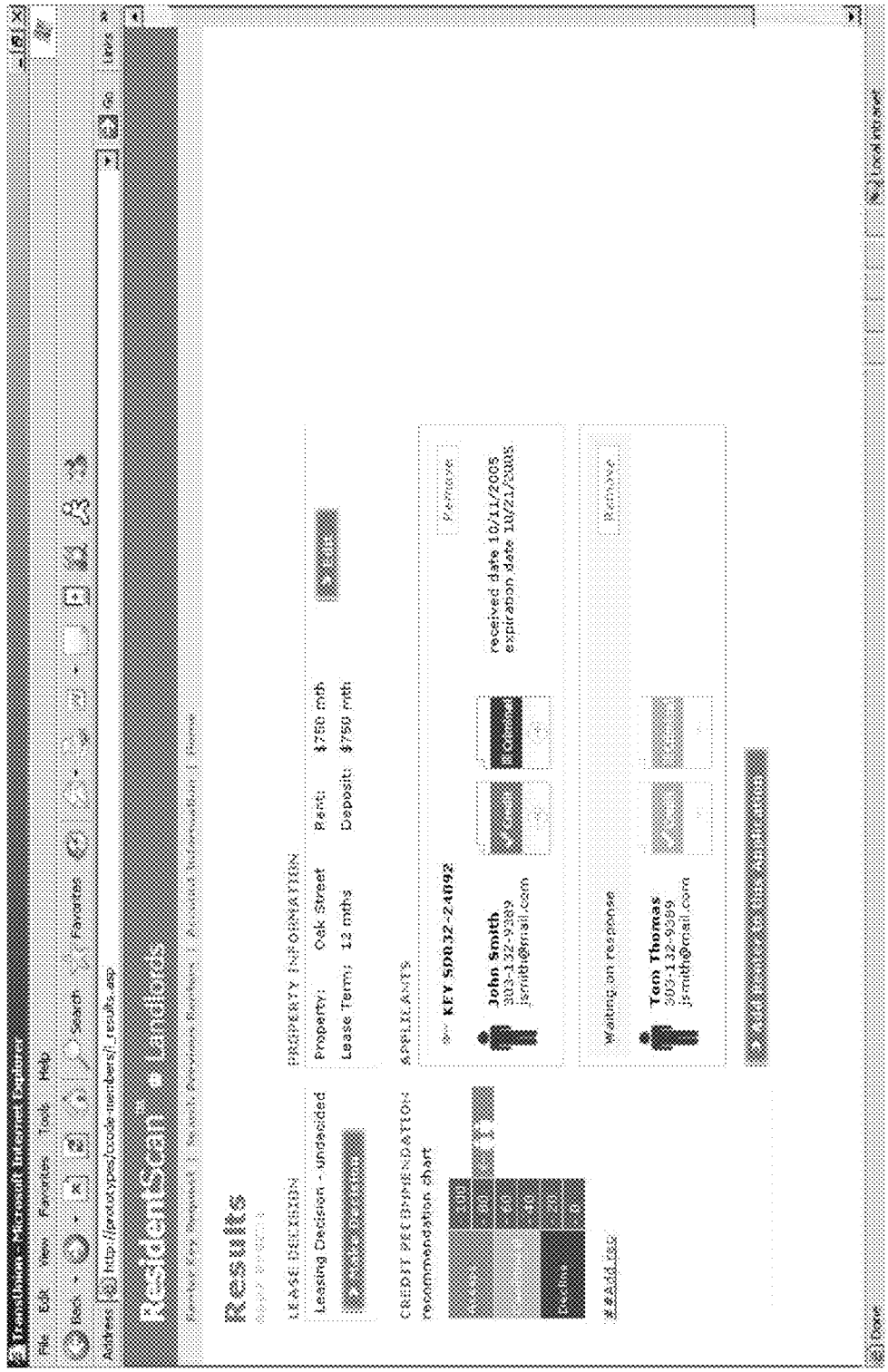
FIG. 33 illustrates a screenshot of applicant screening results.

For example, an applicant profile indicating an applicant has a poor credit history may be given a poor screening result or a high risk level, while an applicant profile indicating an applicant has a good credit history may be given a good screening result or a low risk level. Once the screening server 2712 has generated screening results, based upon an applicant profile, the screening server 2712 may then notify the property manager 2724 that the screening results are available. An example screenshot illustrating recommendations or risk levels for applicant profiles is shown in FIG. 33.

The screening server 2712 then notifies (represented by arrow 2728) the property manager 2724 that the screening results are available by using any method or type of communication or notification device. This notification provides a property manager 2724 with immediate notification that applicant 2702 screening results are available and/or have been updated. For example, the screening server 2712 can send the property manager 2724 an email (represented by arrow 2728) notifying him/her that the screening results are available. The email may contain particular information alerting the property manager 2724 that screening results are available for a particular applicant(s) 2702. The email may also contain a selectable link, such as a hypertext link, which the property manager 2724 may activate by selecting or clicking on the hypertext link. The email or selectable link within the email may direct the property manager 2724 to the most recent results available. Thus, the property manager 2724 may be immediately notified when applicant profiles are updated and/or when screening results are available for an applicant 2702.

Selecting the hypertext link then directs or requests that the screening server 2712 send (represented by arrow 2730) the screening results to the property manager 2714. The screening server 2712 then sends (represented by arrow 2732) the screening results to the property manager 2724 for review via email or by directing the property manager 2724 to a particular screen or window, such as an internet website, via a selectable hypertext link. The screening results provided to the property manager 2724 are based upon the applicant profile, which is based upon the applicant 2702.

Because the property manager 2724 receives a communication containing a selectable hypertext link to the screening results stored on the screening server 2712, the property manager 2724 does not need to enter a personal identification code or number to access the screening results. Once the property manager 2724 clicks on the selectable link he/she may be directed to an entry or login screen requesting he/she provide login information, such as a username and/or password, for example. The login may then direct the property manager 2724 to a list of applicant profiles, eliminating the need for the property manager 2724 to enter a separate password or key (such as a personal identification number) for each individual applicant profile. This improves the operating efficiency of the system 2700 by providing more immediate access to screening results on the screening server 2712. Said another way, the screening results on the screening server 2712 are be access controlled. This provides a more efficient means of screening applicant(s) 2702, and eliminates the need to remember or track multiple passwords or multiple personal identification numbers for each applicant 2702.

After reviewing the screening results, the property manager 2724 can elect to take further action, or make a decision, based upon the screening results received. The property manager 2724 may further direct a decision action or result be communicated to the applicant 2702, to notify the applicant 2702 of the status or decision made on his/her application. For example, if the screening results show a positive recommendation, a property manager 2724 may direct that a positive decision action, such as "accepted" or "approved," be communicated to the applicant 2702. In some implementations, the property manager 2724 may receive one communication or email message containing multiple hypertext links to receive and review the screening results of multiple applicants 2702. In other implementations, the property manager 2724 receive one communication or email message containing one hypertext link which directs the property manager 2724 to a plurality of updated screening results. The property manager 2724 may then make decision actions on a number of different applicants 2702 at one location (i.e. website summarizing all applicant profiles and screening results or recommendations), improving working efficiency of the property manager 2724.

The screening operation described above (with reference to FIG. 27) may be a computer program product on a computer readable medium for use in a data processing system for executing a computer program. In one implementation, the computer program product may comprise a number of different sets of instructions for executing the computer program. The computer program may be executed within screening server 2724, for example.

Figure 34:
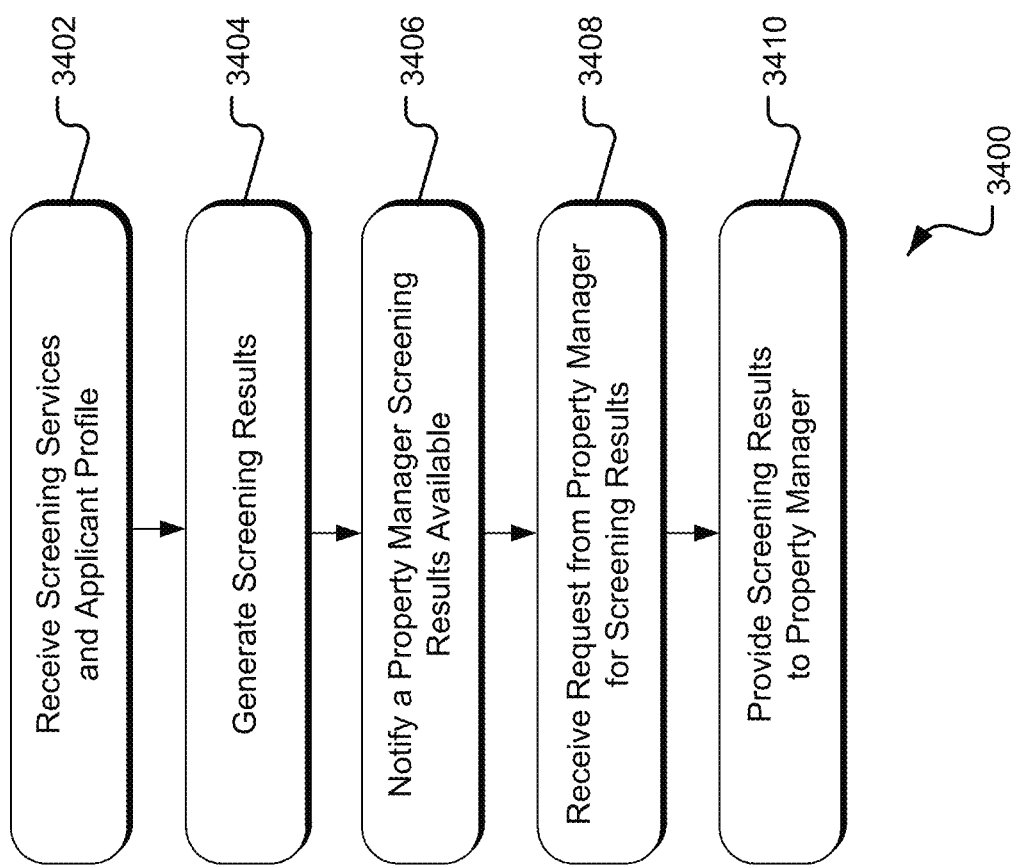
FIG. 34 illustrates exemplary operation of the system of a screening server.

The computer program product 3400 is shown generally, for purposes of illustration, in FIG. 34. The computer program product 3400 on a computer-readable medium, for use in a data processing system for executing a computer program, comprises: i) receiving 3402 a selection of screening services and an applicant profile that identifies an applicant 2702; ii) generating 3404 screening results specified by the selection of screening services based on the applicant profile; iii) notifying 3406 a property manager 2724 that screening results are available for the applicant 2702 based on the applicant profile; and iv) providing 3410 the screening results to the property manager 2724 based on the applicant profile. The computer program product 3400 for use in executing a computer program may further comprise the step of receiving 3408 a request from the property manager 2724 for the screening results.

Figure 35:
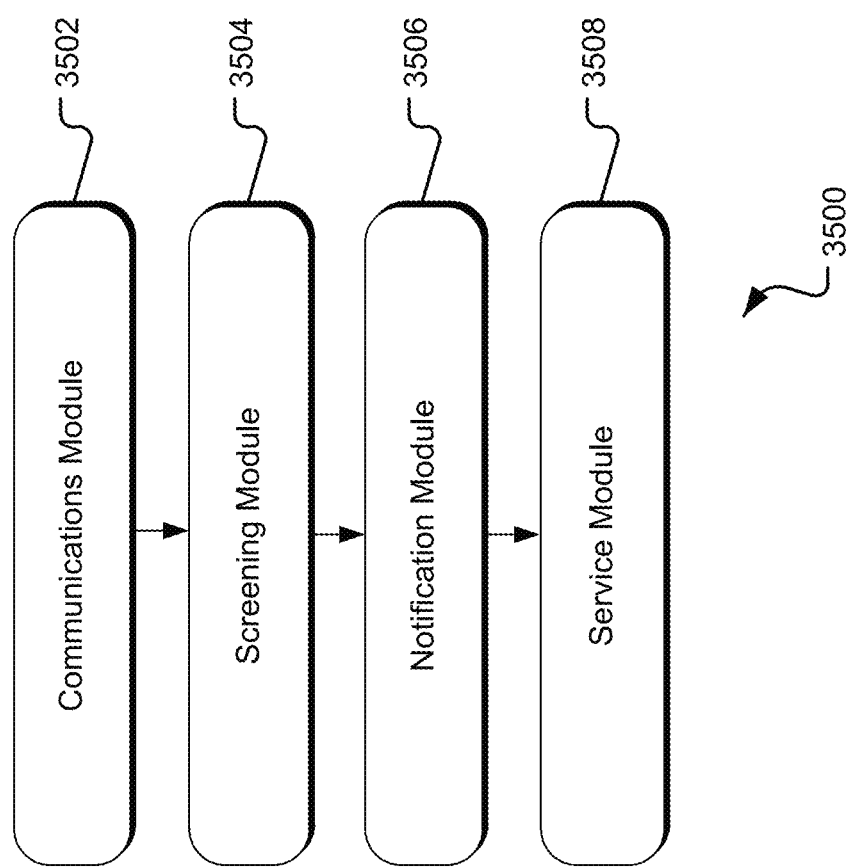
FIG. 35 illustrates an exemplary system for screening.

A system for screening applicants 2702 is also be shown and described with respect to FIG. 35. The system 3500 comprises a communications module 3502, a screening module 3504, a notification module 3506, and a service module 3508. The communications module 3502 receives a selection of screening services. The screening module 3504 receives an applicant profile to identify an applicant 2702 and generate screening results, specified by the selection of screening services, based on the applicant profile. The screening module 3504 may further comprise an encryption module (not shown) to encrypt the applicant profile and screening results within the screening server. The notification module 3506 notifies a property manager 2724 that screening results are available for the applicant 2702 based on the applicant profile. In one example, the notification module 3506 generates an email message and sends the message to the property manager 2724 to notify the property manager 2724 that screening results are available or are ready for his/her review.

The service module 3508 provides the screening results to the property manager 2724 based on the applicant profile. Service module 3508 may also operate to receive requests from the property manager 2724 for the screening results before providing the screening results. The screening results can be provided to the property manager 2724 via a number of different types of communication methods and devices, as described above. In one example, the screening results may be provided when the property manager 2724 activates or selects a hypertext link. In this implementation, the property manager 2724 is directed to a login website where he/she can enter a username and password to view screening results.

Figure 36:
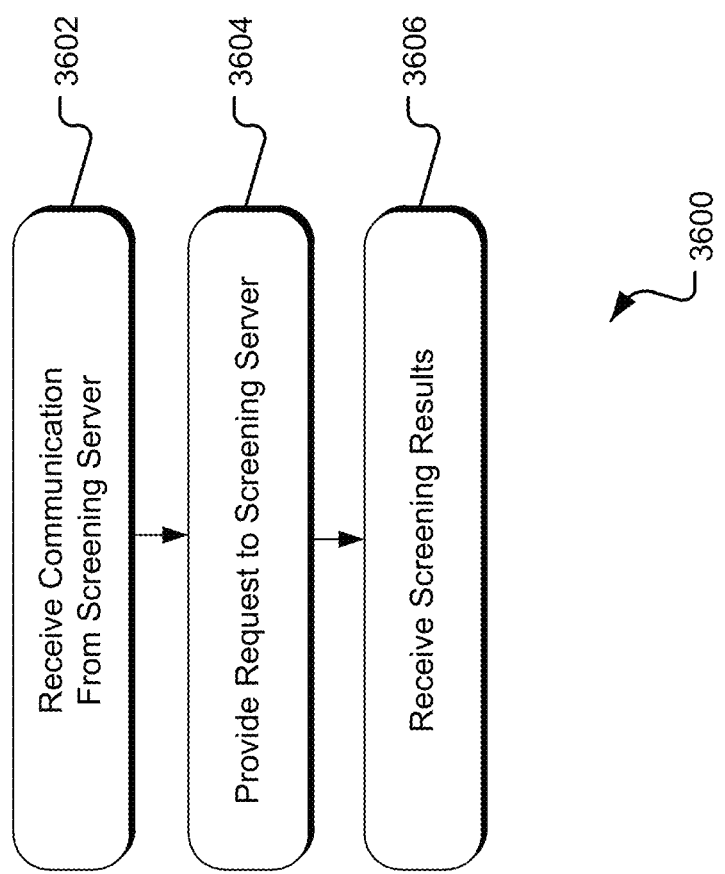
FIG. 36 illustrates exemplary operation for receiving screening results.

One implementation of accessing screening results (shown as 3600 in FIG. 36) is also described from the perspective of the property manager 2724. With reference to FIG. 36, the property manager 2724 receives 3602 a communication from a screening server 2712, the communication being associated with an applicant profile entered by the applicant 2702. The property manager 2724 then provides 3604 a request to the screening server 2712 for the screening results generated based upon the applicant profile. Finally, the property manager 2724 receives 3606, from the screening server 2712, screening results associated with the applicant 2702.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
   receiving, by a screening service, an applicant profile that identifies an applicant;
   receiving acceptable risk levels;
   generating, using a computer system, recommendations based on the acceptable risk levels and the applicant profile;
   notifying the applicant that the recommendations are available;
   receiving from the applicant an authorization to provide the recommendations to a screener; and
   communicating the recommendations to the screener.

2. The method of claim 1, wherein the acceptable risk levels are correlated to one or more parameters provided in the applicant profile.

3. The method of claim 1, wherein the acceptable risk levels are correlated to at least one of the applicant's income level.

4. The method of claim 1, wherein the recommendation is in the form of chart correlating the applicant with an acceptable risk level.

5. The method of claim 1, wherein the recommendations are used by the screener to make a decision.

6. The method of claim 1, wherein receiving the acceptable risk levels further comprises receiving the acceptable risk levels from the screener.

7. The method of claim 1, wherein receiving the acceptable risk levels further comprises receiving the acceptable risk levels from the applicant.

8. The method of claim 1, wherein receiving the applicant profile further comprises receiving the applicant profile from the applicant.

9. The method of claim 1, further comprising:
   authenticating the applicant; and
   providing the recommendations to the applicant.

10. The method of claim 1, further comprising:
    generating screening results based on the applicant profile; and
    providing the screening results to the screener.

11. The method of claim 1, further comprising:
    receiving a decision action from the screener, wherein the decision action is determined by the screener based on the screening results; and providing the decision action made by the screener to the applicant.

12. The method of claim 1, further comprising:
receiving a request from the screener to view the recommendations; and
authenticating the screener,
wherein providing the recommendations to the screener further comprises providing the recommendations to the screener if the screener is authenticated.

13. The method of claim 1, wherein providing the recommendations to the screener comprises providing the recommendations via a selectable hypertext link.

14. A computer program product on a non-transitory computer-readable medium for use in a data processing system for executing a computer program, the computer program product comprising:
receiving, by a screening service, an applicant profile that identifies an applicant;
generating, using a computer system, recommendations based on acceptable risk levels and the applicant profile;
notifying the applicant that the recommendations are available;
receiving from the applicant an authorization to provide the recommendations to a screener; and
communicating the recommendations to the screener.

15. The computer program product of claim 14, further comprising generating, using a computer system, screening results based on the acceptable risk levels and the applicant profile, wherein the screening results are not provided to the screener.

16. The computer program product of claim 14, further comprising notifying the screener via an email that the recommendations are available for the applicant.

17. The computer program product of claim 14, wherein the acceptable risk levels are received from the screener.

18. A system for screening, comprising:
a communications module, implemented using a hardware processor, to receive a selection of screening services;
a screening module, implemented using the hardware processor, to receive an applicant profile to identify an applicant and generate recommendations, based on the applicant profile and acceptable risk levels;
an authorization module, implemented using the hardware processor, for receiving from the applicant an authorization to provide the recommendations to a screener;
a notification module, implemented using the hardware processor, to notify screener that recommendations are available for the applicant; and
a service module, implemented using the hardware processor, to authenticate the screener, and in response to the authentication, provide the recommendations to the screener.

19. The system of claim 18, wherein the acceptable risk levels are received from the screener.

20. The system of claim 18, wherein the recommendation is in the form of chart correlating the applicant with an acceptable risk level.

\* \* \* \* \*